(12) United States Patent
Ito et al.

(10) Patent No.: US 8,075,151 B2
(45) Date of Patent: Dec. 13, 2011

(54) SURFACE LIGHT SOURCE DEVICE AND IMAGE DISPLAY DEVICE

(75) Inventors: Atsushi Ito, Kanagawa (JP); Yoshiaki Kouyama, Tokyo (JP)

(73) Assignee: Sony Corporation (JP)

( * ) Notice: Subject to any disclaimer, the term of this patent is extended or adjusted under 35 U.S.C. 154(b) by 259 days.

(21) Appl. No.: 12/386,156

(22) Filed: Apr. 14, 2009

(65) Prior Publication Data

US 2009/0262521 A1    Oct. 22, 2009

(30) Foreign Application Priority Data

Apr. 17, 2008  (JP) ............... P2008-107486
Jul. 24, 2008  (JP) ............... P2008-190601

(51) Int. Cl.
*G09F 13/08* (2006.01)

(52) U.S. Cl. ....... 362/97.1; 362/235; 362/309; 362/607; 362/627

(58) Field of Classification Search ................ 362/97.1, 362/235, 607, 613, 614, 623, 624, 627, 634
See application file for complete search history.

(56) References Cited

U.S. PATENT DOCUMENTS

| 7,255,462 B2 * | 8/2007 | Tseng ........................... 362/330 |
| 2004/0189892 A1 | 9/2004 | Ono et al. |
| 2005/0141212 A1 | 6/2005 | Moon et al. |

FOREIGN PATENT DOCUMENTS

| JP | 10-283818 A | 10/1998 |
| JP | 2004-170698 A | 6/2004 |
| JP | 2005-134441 A | 5/2005 |
| JP | 2006-162827 A | 6/2006 |
| JP | 2007-080747 A | 3/2007 |
| WO | 2008024617 A1 | 2/2008 |

OTHER PUBLICATIONS

European Search Report, EP 09156575, dated Aug. 4, 2009.

* cited by examiner

*Primary Examiner* — John A Ward
(74) *Attorney, Agent, or Firm* — Lerner, David, Littenberg, Krumholz & Mentlik, LLP

(57) ABSTRACT

A surface light source device includes a diffusing member which diffuses light, a reflective member which reflects light, plural light sources provided aligned in a flat manner between the diffusing member and the reflective member, and a light control member provided between the plural light sources and the reflective member as well as arranged in a state that a gap is imposed between the reflective member and the light control member, which has a light-guiding function of guiding part of light emitted from respective light sources in an alignment direction of the light sources, in which the light control member has a rugged structure portion in which geometric shapes in cross section are continuously formed on at least one surface.

12 Claims, 14 Drawing Sheets

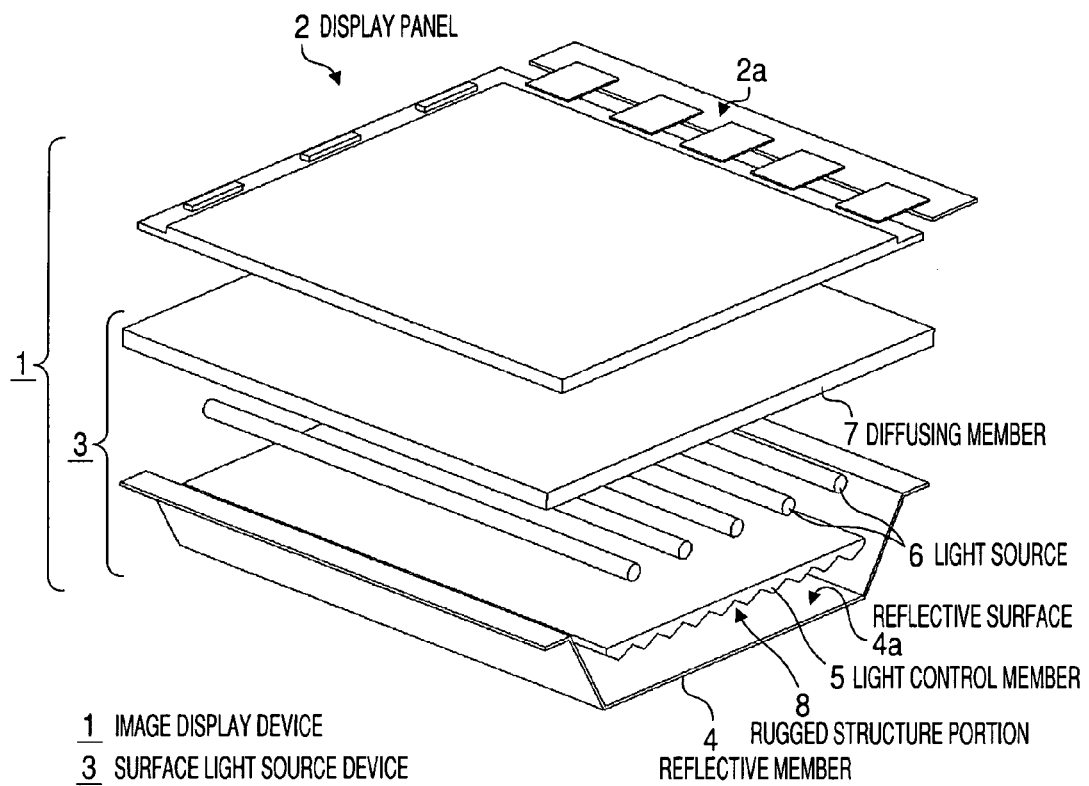
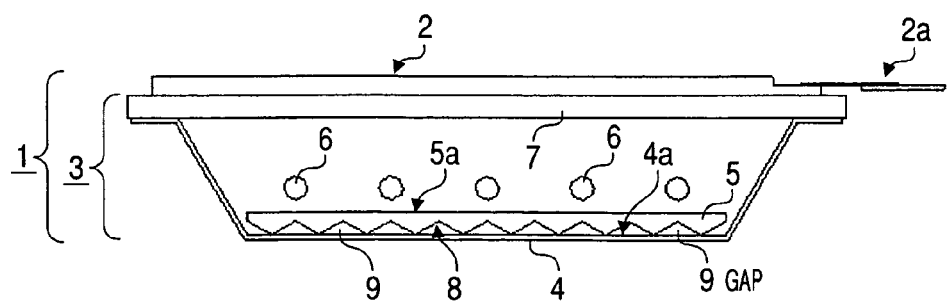

SURFACE LIGHT SOURCE DEVICE AND IMAGE DISPLAY DEVICE

BACKGROUND OF THE INVENTION

1. Field of the Invention

The present application claims priority from Japanese Patent Application No. JP 2008-107486 filed in the Japanese Patent Office on Apr. 17, 2008 and Japanese Patent Application No. JP 2008-190601 filed in the Japanese Patent Office on Jul. 24, 2008, the entire contents of which are incorporated herein by reference.

The present invention relates to a surface light source device irradiating light and an image display device using the same.

The present invention relates to a surface light source device irradiating light and an image display device using the same.

2. Description of the Related Art

There exists a surface light source device performing illumination by using light sources such as a cold cathode fluorescent lamp (CCFL) and a light emitting diode (LED). The surface light source device is used for, for example, lighting equipment by using the light source as illumination directly, or used for image display devices such as a television receiver and a personal computer by using the light source as backlight illumination.

As the above image display device, for example, a liquid crystal display device using a liquid crystal panel as a display panel on which images are displayed can be cited. Since the liquid crystal panel is not a self-luminous type display in the liquid crystal display device, a surface light source device irradiating light from the back surface side with respect to the liquid crystal panel is disposed. In this case, the surface light source device is used as a backlight device irradiating light to the liquid crystal panel from the back surface side.

In the surface light source device used as the backlight device, there are a device called as a side-edge type and a device called as a direct-method type. The side-edge type surface light source device includes a light guide member as well as a light source disposed at the side of the light guide member, which irradiates light to the display panel by guiding light emitted from the light source by the light guide member to a given direction. The direct-method type surface light source device includes light sources disposed at the back surface side of the display panel, which irradiates light emitted from the light sources to the display panel. In a liquid crystal display device used as a television receiver and a large-sized liquid crystal display device, the direct-type backlight device is mainly used as the surface light source device because it is necessary to obtain bright images.

The surface light source device used for the liquid crystal display device commonly includes a diffusing member (a diffusing plate or a diffusing sheet) arranged facing the back surface of the liquid crystal panel and a reflective member arranged at the back surface side of the diffusing member. In the surface light source device, for example, plural fluorescent lamps such as cold cathode fluorescent lamps used as light sources are arranged in a state aligned in a given direction, and the diffusing member is arranged between the fluorescent lamps and the display panel. The diffusing member has a function of avoiding visual recognition of outer shapes of the fluorescent lamps through the display panel and avoiding recognition of existence of the fluorescent lamps as lamp images by the user by diffusing light emitted from the fluorescent lamps and irradiating light to the display panel uniformly. The diffusing member also has a function of irradiating light emitted from light sources to the liquid crystal panel uniformly to secure uniformity of luminance of a display screen in the liquid crystal panel.

In the liquid crystal display device, when light is emitted from light sources, the emitted light is diffused by the diffusing member and irradiated to the liquid crystal panel on which an image is displayed from the back surface side. At this time, light is emitted from the light sources not only to the diffusing member side but also to the reflective member side. The light emitted to the reflective member side is reflected by the reflective member and incident on the diffusing member, then, the light is diffused by the diffusing member and irradiated to the liquid crystal panel.

In the liquid crystal display device as described above, the demand for a thinner device is extremely high. As a method for obtaining the thinner device, a method of shortening distance between light sources and the diffusing member can be considered. However, when the distance between light sources and the diffusing member is shortened, the existence of lamps as described above tends to be recognized as lamp images.

Accordingly, a surface light source device disclosed in, for example, JP-A-2006-162827 (Patent Document 1) is proposed, in which a member called as a prism array is disposed between light sources and the diffusing member and light irradiated just above the light sources is reflected by the member to reduce luminance just above the light sources, as a result, the recognition as lamp images is reduced. Another approach for improving uniformity by arranging a light control member which is an arrangement structure of a lens between the reflective member and light sources is performed. Specifically, for example, in JP-A-2007-80747 (Patent Document 2), a surface light source device in which the light control member on the reflection sheet is allowed to be a fresnel-lens shape and light is condensed between the light sources to reduce the recognition of the lamp images is proposed. Additionally, for example, in U.S. Patent Application Publication No. 2005/0141212 (Patent Document 3), a surface light source device in which the light control member on the reflection sheet is allowed to be a circular shape and the diffusing function is improved to reduce the recognition of the lamp images is proposed. Also, in JP-A-10-283818 (Patent Document 4), a surface illuminant in which a lens sheet having linear protrusions is disposed between the light sources and the reflection plate is disclosed.

SUMMARY OF THE INVENTION

In the surface light source device disclosed in Patent Document 1, directivity occurs in light emitted to the light-emitting surface side due to the function of the prism array. It is desirable to suppress the directivity of light to be as small as possible in order to realize uniform display as the liquid crystal display device. Therefore, it is usually necessary to stack plural optical films such as diffusion sheets between the prism array and the light-emitting surface to cancel out the directivity of light. However, since this kind of optical film is generally expensive, the costs increase. Additionally, since light sequentially passes through the plural optical films in actual fact, use efficiency of light decreases.

On the other hand, in the surface light source device disclosed in Patent Document 2, advanced optical design is necessary for condensing light between adjacent lamps as well as skilled assembly accuracy corresponding to the optical design is necessary. Accordingly, there is a problem that, for example, slight displacement of lamps is recognized as unevenness of display. Additionally, individual design of the fresnel lens is necessary at respective surface light source devices having different arrangements of various optical members. Therefore, there is a problem that it is difficult to obtain mass-production efficiency and the device will be an expensive component. In the surface light source device disclosed in Patent Document 3, it is difficult to obtain the function of guiding light between adjacent lamps. Therefore, it is difficult to allow the device to be a thinner in actual fact.

It is desirable to provide a structure in which a surface light source device is allowed to be thin with low costs without making the lamp images conspicuous.

A surface light source device according to an embodiment of the invention includes a diffusing member which diffuses light, a reflective member which reflects light, plural light sources provided aligned in a flat manner between the diffusing member and the reflective member, and a light control member provided between the plural light sources and the reflective member as well as arranged in a state that a gap is imposed between the reflective member and the light control member, which has a light-guiding function of guiding part of light emitted from respective light sources in an alignment direction of the light sources, in which the light control member has a rugged structure portion in which geometric shapes in cross section are continuously formed on at least one surface.

In the surface light source device according to the embodiment of the invention, part of light which has been incident on the light control member from respective light sources aligned in a flat manner is incident on the diffusing member at a position apart from the light source due to the light-guiding function by the light control member and the angle modulation function of light.

According to the embodiment of the invention, the light control member is inserted between plural light sources and the reflective member, and the rugged structure portion in which geometric shapes in cross section are formed continuously is provided on at least one surface of the light control member, thereby allowing the light control member to have the light-guiding function and thereby guiding light between plural light sources (intermediate position) by using the light-guiding function. As a result, it is possible to reduce the number of light sources and to shorten the distance between the light sources and the diffusing member without making the lamp images conspicuous. Accordingly, the surface light source device is allowed to be thin with low costs. Additionally, an image display device is formed by combining the surface light source device with a display panel, thereby allowing an image display device to be thin.

BRIEF DESCRIPTION OF THE DRAWINGS

FIG. 1 is an exploded perspective view showing a structure of an image display device according to a first embodiment of the invention;

FIG. 2 is a side view showing the structure of the image display device according to the first embodiment of the invention;

DESCRIPTION OF THE PREFERRED EMBODIMENTS

Figure 3:
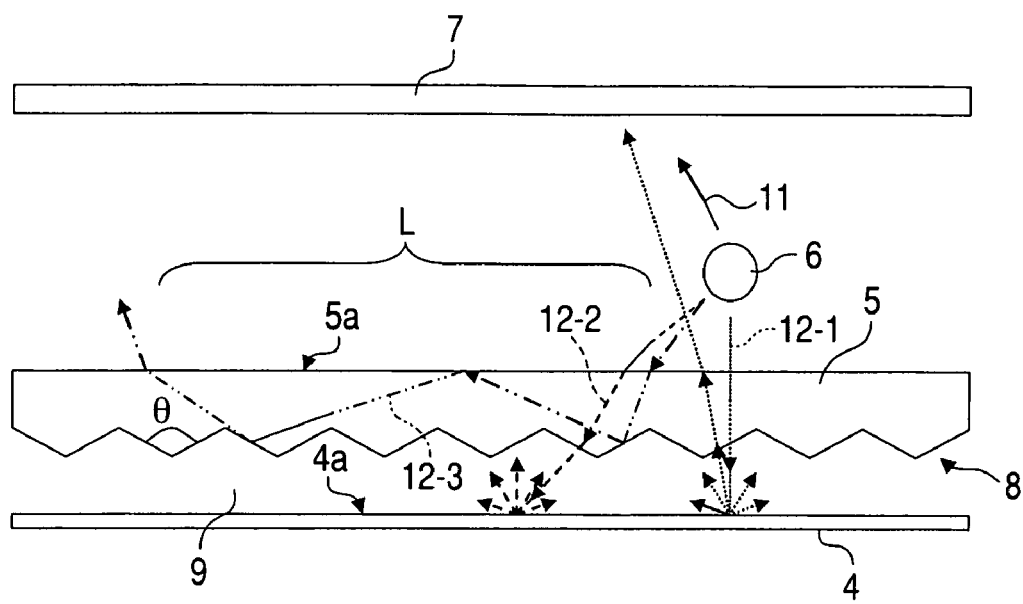
FIG. 3 is a view explaining functions of a light control member.

Hereinafter, embodiments of the invention will be explained in detail with reference to the drawings. The technical range of the invention is not limited to the embodiments described below and includes various modifications and alternations within the scope in which specific effects obtained by constituent features and combinations of the invention can be derived.

In the embodiments described below, a case in which an image display device according to an embodiment of the invention is applied to a television receiver (liquid crystal display device) displaying images on a liquid crystal panel and a case in which a surface light source device according to an embodiment of the invention is applied to a surface light source device provided in the television receiver are considered. However, the invention is not limited to the television receiver including the liquid crystal panel and the surface light source device provided in the television receiver, and can be widely applied to other various television receivers, an image display device used for a personal computer and the like as well as various surface light source devices used for them.

FIG. 1 is an exploded perspective view showing a structure of an image display device according to a first embodiment of the invention, and FIG. 2 is a side view showing the structure of the image display device.

An image display device 1 roughly includes a display panel 2 which displays images and a surface light source device 3 which emits light to the display panel 2. When the image display device 1 is a liquid crystal display device, the display panel 2 will be a liquid crystal panel, and the surface light source device 3 will be a backlight.

The image display device 1 has a structure in which respective necessary portions are arranged inside a not-shown outer casing. In this case, the outer casing is formed to be flat in the front-and-back direction as well as to have a box shape which opens forward, and the display panel 2 is disposed at a position where the panel blocks the opening from the inside. The display panel 2 has a structure, for example, in which a transmissive color liquid crystal panel is sandwiched by two polarizing plates from front-and-back sides (a light incident side and a light emitting side). In this case, the display panel 2 displays full-color video by being driven in an active-matrix method.

The display panel 2 displays images, for example, by allowing light irradiated from the surface light source device 3 to be transmitted selectively in the unit of pixels arranged in a matrix state. To the display panel 2, for example, a drive circuit portion 2a arranged below is connected. The drive circuit portion 2a is a circuit portion controlling driving of the display panel 2.

The surface light source device 3 is arranged inside the outer casing. The surface light source device 3 includes a reflective member 4, a light control member 5, plural light sources 6 and a diffusing member 7. The reflective member 4, the light control member 5, the light sources 6 and the diffusing member 7 are arranged in the order from the backward side (the side far from an available screen area of the display panel 2) when seen from the available screen area of the display panel 2. The available screen area of the display panel 2 indicates an area in which display of images is actually performed for the user. The surface light source device 3 is arranged so that the diffusing member 7 faces the display panel 2.

The reflective member 4 has a reflective surface 4a which is a surface facing the light sources 6 and formed to have a wing shape in side view. The reflective surface 4a of the reflective member 4 is arranged in parallel to the diffusing member 7 having a sheet shape. There exist a reflective member which performs specular reflection mainly and a reflective member which performs diffuse reflection mainly in the reflective member 4, and it is preferable to use the one which performs diffuse reflection mainly in this case. The reason is that the one which mainly performs specular reflection has high directivity of reflected light, which tends to be recognized as unevenness on display, on the other hand, the one which mainly performs diffuse reflection has low directivity of reflected light, which does not tend to be recognized as unevenness on display. The reflective member 4 which mainly performs diffuse reflection can be obtained by, for example, inserting a great deal of air bubbles inside a PET (Polyethylene Terephthalate) film, however, the invention is not limited to this. As a component material of the reflective member 4, it is possible to apply both resin and metal.

The light control member 5 is formed, for example, in a thin-plate shape or a sheet shape which is rectangular in plan view as shown in the drawing. The light control member 5 is disposed between the reflective member 4 and the light sources 6. The light control member 5 has a structure of stacking materials which have light transmittance, for example, transparent materials such as acrylic, polycarbonate, polystyrene and glass, or combinations of plural these transparent materials in the thin-plate shape or the sheet shape.

The plural light sources 6 are arranged in a flat manner between the diffusing member 7 and the reflective member 4. The respective light sources 6 are arranged so as to face the reflective surface 4a of the reflective member 4 through the light control member 5. As the light source 6, for example, a rod-shaped cold cathode fluorescent lamp (CCFL) is used. However, the light source 6 is not limited to the cold cathode fluorescent lamps, and other light sources can be used, for example, a hot cathode fluorescent lamp, a xenon lamp, a light emitting diode (LED) and the like.

Each light source 6 is formed to be a slender cylindrical shape. The light sources 6 are disposed so that the longitudinal direction (stretching direction) of the light source 6 is parallel to the right-and-left direction of the screen of the display panel 2. The light sources 6 are disposed in the up-and-down direction of the screen of the display panel 2 at fixed intervals. Both ends of each light source 6 in the longitudinal direction are held by not-shown lamp sockets and power is fed from both ends to emit light.

The diffusing member 7 diffuses light incident on the diffusing member 7 to allow light incident on the display panel 2 uniform. The diffusing member 7 is formed to be a sheet shape. The diffusing member 7 is also disposed between the light sources 6 and the display panel 2 so as to face the reflective surface 4a of the reflective member 4. The diffusing member 7 has a function of diffusing light incident on the diffusing member 7 and supplying uniform light to the display panel 2 side. As the diffusing member 7, for example, the one in which a light scattering material not having orientation is mixed can be applied.

Here, the light control member 5 will be explained further in detail. The light control member 5 has a light-guiding function of guiding part of light emitted from respective light sources 6 to a given direction. The "given direction" indicates an alignment direction of the plural light sources 6 provided so as to be aligned in a flat manner as described above. The light-guiding function of the light control member 5 is realized by reflecting (total reflection) light incident on the light control member 5 inside the light control member 5 once or plural times repeatedly. The light control member 5 guides part of light irradiated from the light sources 6 to the light control member 5 to the alignment direction of the light sources 6 by the light-guiding function, thereby emitting light incident from the light sources 6 toward the diffusing member 7 at positions displaced from the incident position of light in the alignment direction of the light sources 6.

The light control member 5 has an ultraviolet resistant function by forming the light control member 5 using a material absorbing ultraviolet. Ultraviolet is included in components of light emitted from the light sources 6. Therefore, the light control member 5 has the ultraviolet resistant function, thereby preventing deterioration of the light control member 5. It is also possible to prevent discharge of ultraviolet in the image display device 1 to the outside due to the ultraviolet resistant function of the light control member 5.

The light control member 5 has a flat surface which is the side facing the light sources 6 and the diffusing member 7 (hereinafter, also referred to as "light sources 6 side"), and also has a rugged structure portion 8 at an surface which is the opposite side, facing the reflective member 4 (hereinafter, also referred to as "reflective member 4 side"). The rugged structure portion 8 is arranged in a state facing the reflective surface 4a of the reflective member 4. The rugged structure portion 8 has a geometric shape in cross section seen from the direction orthogonal to the alignment direction of the light sources 6. As an example of the geometric shape in cross section, the rugged structure portion 8 is formed to be a rugged shape with continuous triangular shapes in cross section. Respective convex portions in the rugged structure portion 8 having triangular shapes in cross section substantially function as prisms.

The rugged shape in the rugged structure portion 8 is formed continuously in the alignment direction of the light source 6 in a repeated manner. Concave portions and convex portions included in the rugged structure portion 8 are arranged so as to be adjacent to one another in the alignment direction of the light sources 6, which are formed in a state extending straight in the longitudinal direction of the light sources 6. Therefore, the extending direction of the convex portions and the concave portions of the rugged structure portion 8 is parallel to the longitudinal direction of the light sources 6.

The light control member 5 is arranged so as to be adjacent to the reflective member 4 in the direction perpendicular to the reflective surface 4a of the reflective member 4. A gap 9 is interposed between the reflective member 4 and the light control member 5. The gap 9 will be a substantial air layer, which is secured along the concave portions of the rugged structure portion 8 by allowing apexes of the convex portions in the rugged structure portion 8 to touch (line contact) the reflective surface 4a of the reflective member 4 or by arranging the convex portions and the reflective surfaces 4 closely. In this case, the gap 9 is interposed between the reflective surface 4a of the reflective member 4 and slopes of the convex portions included in the rugged structure portion 8 of the light control member 5. However, it is not limited to this, and for example, even when the rugged structure portion 8 of the light control member 5 is arranged so as to be apart from the reflective surface 4a of the reflective member 4, the gap 9 is interposed between the reflective member 4 and the light control member 5. In order to make the surface light source device 3 thinner, it is preferable that the convex portions (apexes) of the rugged structure portion 8 abut on the reflective surface 4a of the reflective member 4 or both are arranged so as to be close to each other.

In the rugged structure portion 8, the convex portions and the concave portions are closely arranged at an interval of 0.1 mm in a state that the convex portions and the concave portions are continuously aligned in the alignment direction of the light sources 6 without a gap. The convex potion in the rugged structure portion 8 has a triangular shape in cross section and an apex angle positioned at the top thereof is set to, for example, 130 degrees. The convex portion in the rugged structure portion 8 has an isosceles-triangular shape in cross section. An appropriate apex angle of the convex portion in the rugged structure portion 8 varies depending on the interval of the light sources 6, the positional relationship of respective members (4, 5, 6, 7) and the like, it is preferable to set to the optimum angle by simulation.

Part of light emitted from respective light sources 6 is incident on the light control member 5 as described later, and the rugged structure portion 8 continuously arranged in the alignment direction of the light sources 6 transmits most of light which is incident from respective light sources 6 almost vertically with respect to the flat surface (hereinafter, referred to as a "reference surface") 5a of the light control member 5 as well as reflects part of light which is incident from a inclined direction, which realizes effect of reducing unevenness on display. The "inclined direction" written here indicates direction having an inclined angle with respect to an axis which is vertical to the reference surface 5a of the light control member 5. The "inclined direction" will be prescribed further in detail later.

The light control member 5 is fixed by, for example, a method using an adhesive or a method of using screws and the like in order to keep a relative position between the reflective member 4 and the light control member 5 to be constant. It is preferable that the light control member 5 fixes, for example, an outer peripheral portion of the light control member 5 other than the available screen area of the display panel 2 to the reflective member 4 by the above method. Accordingly, it is possible to prevent the light control member 5 from being apart from the reflective member 4 and floated freely. The fixing method of the light control member 5 is not limited to the above method and can be applied within freedom of design.

It is necessary that the diffusing member 7 has sufficient diffusing property in order to cancel the directivity of light emitted from the light control member 5 as well as to eliminate the lamp images. It is also necessary that the diffusing member 7 has low light absorptance in order to increase use efficiency of light emitted from respective light sources 6. In order to secure such characteristics, the diffusing member 7 is formed by mixing transparent minute particles having different refractive indexes into a material to be a base material. As the base material, for example, polystyrene is used. As the transparent minute particles, for example, silicon or acrylic is used.

It is also possible to obtain desired optical characteristics by installing arbitrary optical components on the emitting surface side of the diffusing member 7 to have desired optical characteristics. For example, an optical component in which beads are scattered and fixed on the base material such as a transparent PET and a lens effect due to curved surface of beads is expected, a sheet in which fine prisms are arranged to improve luminance in the front direction, a polarized-light reflection sheet and the like can be used.

In the image display device 1 having the above structure, as shown in FIG. 3, light emitted from respective light source 6 of the surface light source device 3 is roughly divided into a light 11 which is directly incident on the diffusing member 7 and a light 12 which is directly incident on the light control member 5. In these lights, the light 11 which is directly incident on the diffusing member 7 from the light source 6 will be incident on the display panel 2 in a state of being diffused by the diffusing member 7. The light 12 which is directly incident on the light control member 5 from the light source 6 will be incident on the diffusing member 7 in a state in which luminous flux amounts are uniformed in a virtual plane in which the plural light sources 6 are aligned by the light-guiding function of the light control member 5 which will be described below.

The light 12 which is directly incident on the light control member 5 from the light source 6 is roughly divided into lights 12-1, 12-2 transmitted through the light control member 5 and proceed to the reflective member 4 side and a light 12-3 which is reflected inside the light control member 5 and proceeds to the diffusing member 7 side. In these lights, most of the light 12-1 which is incident on the reference surface 5a of the light control member 5 from the light source 6 at a vertical angle or an angle close to the vertical angle is transmitted through the light control member 5 and proceeds to the reflective member 4 side. The light 12-1 proceeds to the reflective member 4 side is diffusing-reflected at the reflective surface 4a of the reflective member 4, then, incident on the light control member 5 again. At that time, light proceeding above from just below the light source 6 reaches the diffusing member 7 at a position slightly apart from the light source 6 because proceeding angle is modulated due to a slope of the convex portion in the rugged structure portion 8.

On the other hand, part of light 12-2 in the lights 12-2, 12-3 which are incident on the reference surface 5a of the light control member 5 from the "inclined direction" is transmitted through the light control member 5 and proceeds to the reflective member 4 side in the same manner as the light 12-1. The remaining part 12-3 of light which is incident from the "inclined direction" repeats the total reflection at the slopes of the convex portions having the triangular shape in cross section as shown in the drawing and the total reflection at the reference surface 5a inside the light control member 5 several times, then, proceeds from the reference surface 5a and the reaches the diffusing member 7. Additionally, there are a case in which the light which is incident at an angle from the reference surface 5a is totally reflected at the slope of the convex portion, then, proceeds from the reference surface 5a and reaches the diffusing member 7, and a case in which the light which is incident at an angle from the reference surface 5a is totally reflected at the reference surface 5a again, then, totally reflected at the slope of the convex portion, proceeds from the reflective surface 5a and reaches to the diffusing member 7. In either case, the gap 9 interposed between the reflective member 4 and the light control member 5 is a necessary element for totally reflecting light at slopes of the convex portions in the rugged structure portion 8 (that is, an interface between the light control member 5 and the gap 9). The "inclined direction" indicates the direction satisfying conditions in which part of light incident on the reference surface 5a of the light control member 5 is totally reflected at the slope of the convex portion in the rugged structure portion 8.

As described above, the light 12-3 which is totally reflected inside the light control member 5 is guided in the alignment direction of the light sources 6 inside the light control member 5, thereby being emitted from the reference surface 5a at an angle toward the diffusing member 7 at a position apart from the position where the light is incident on the reference surface 5a at first by a distance "L". In this case, the light incident on the light control member 5 from the light source 6 is guided in the alignment direction of the light sources 6 by the distance "L" inside the light control member 5. Therefore, the light emitted from the light source 6 can be guided to the position apart from the light source 6. Accordingly, luminous flux amounts of light irradiated toward the display panel 2 from the diffusing member 7 can be uniformed. To uniform luminous flux amounts indicates that light having uniform luminous flux amounts is emitted from the whole surface of the emitting surface of the diffusing member 7.

Figure 4:
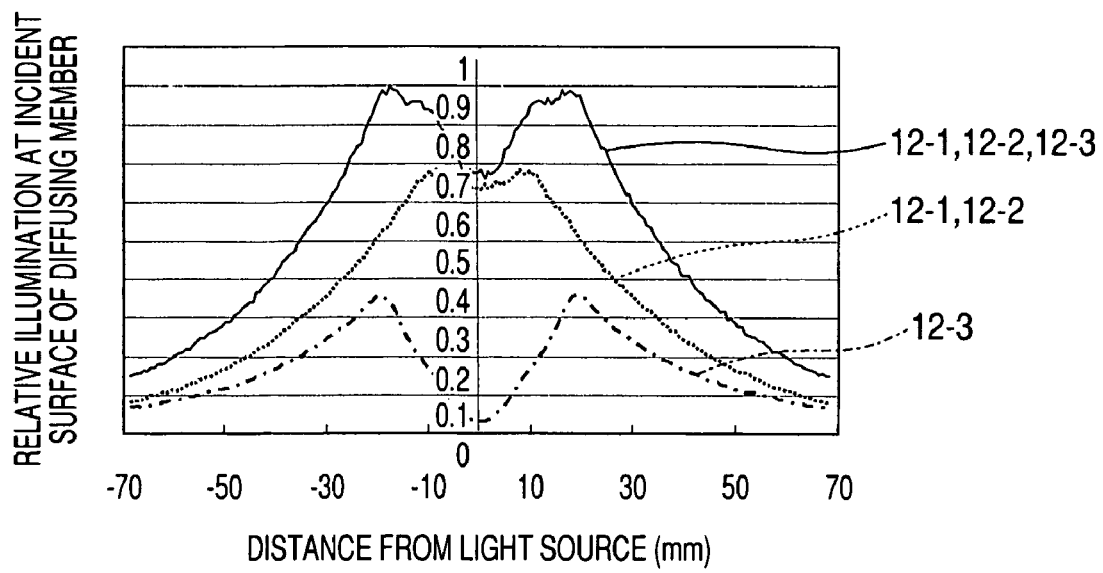
FIG. 4 is a chart showing simulation results according to an embodiment of the invention.
Figure 5:
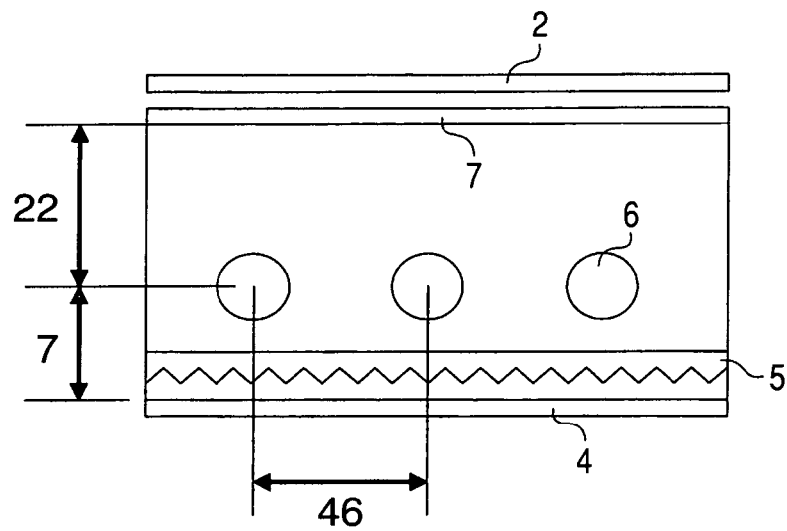
FIG. 5 is a view showing arrangement of members applied in the simulation according to an embodiment of the invention.

Results of simulation performed about the above phenomenon will be shown in FIG. 4. Calculation results of the simulation represent illumination distribution at the light incident surface of the diffusing member 7 when light passed through the light control member 5 reaches the diffusing member 7, in which the horizontal axis in the drawing shows distance from the light sources 6 and the vertical axis shows relative illumination at the light incident surface of the diffusing member 7. In the simulation, the light control member 5 having the rugged structure portion 8 at the surface opposite (downward direction) to the light source 6 is disposed between the light sources 6 and the reflective member 4, and a distance between centers of the light sources 6 in the alignment direction of the light sources 6 is 46 mm as shown in FIG. 5. In the thickness direction of the surface light source device 3, a distance from the center of the light source 6 to the light incident surface of the diffusing member 7 is set to 22 mm, and a distance from the center of the light source 6 to the reflective surface 4a of the reflective member 4 is set to 7 mm.

As can be seen from the simulation results in FIG. 4, concerning the lights 12-1, 12-2 transmitted through the light control member 5 and proceed to the reflective member 4 side, the maximum value of the relative illumination is approximately 0.65 within a range of ±10 mm from the light source 6. On the other hand, concerning the light 12-3 which repeats the reflection inside the light control member 5, the relative illumination at the position of the light source 6 is decreased to approximately 0.05, and the maximum value of the relative illumination is approximately 0.35 at a position ±20 mm apart from the light source 6. As a result, concerning light obtained by summing up the above lights 12-1, 12-2 and 12-3, the relative illumination is lower than 0.7 at the position of the light source 6 and the maximum value of the relative illumination is lower than 0.9 at the position ±20 mm apart from the light source 6.

As described above, the light control member 5 is arranged between the light sources 6 and the reflective member 4, thereby increasing relative illumination between the light sources 6 adjacent to one another in the alignment direction. Therefore, display quality of the display panel 2 using the surface light source device 3 is improved, which contributes to realization of a thinner surface light source device 3 and reduction of the number of light sources in the device.

Figure 6:
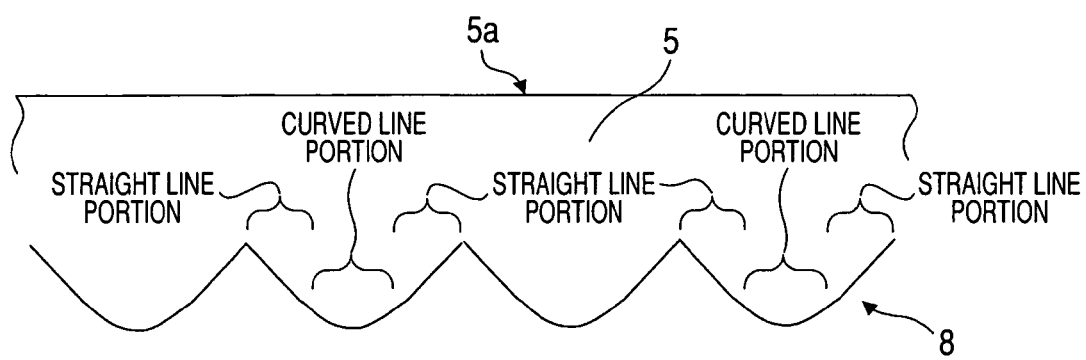
FIG. 6 is a view showing a first modification example of a rugged structure portion of the light control member.
Figure 7:
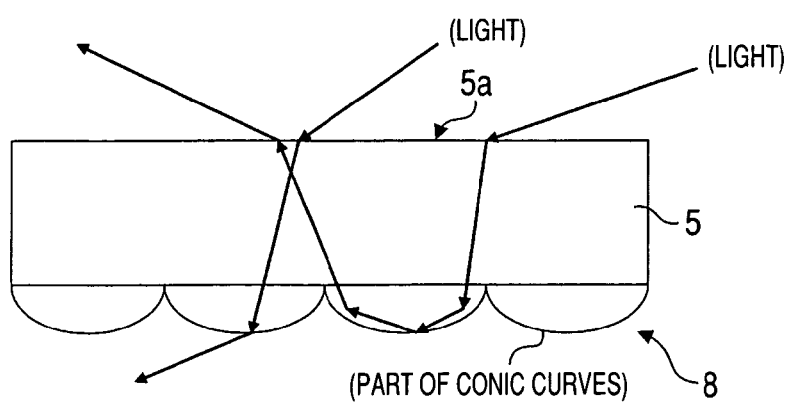
FIG. 7 is a view showing a second modification example of the rugged structure portion of the light control member.
Figure 8:
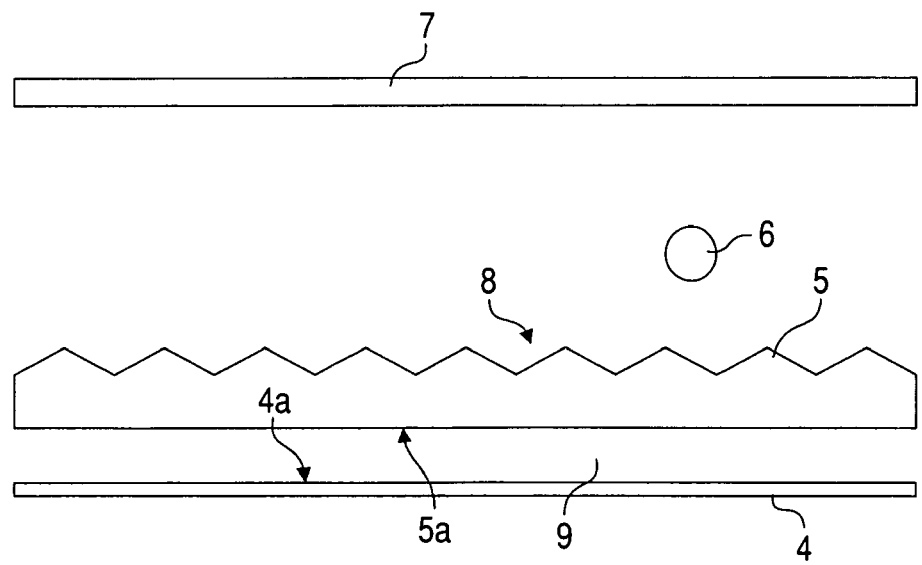
FIG. 8 is a view showing another arrangement example of the light control member.

In the first embodiment, the shape of the convex portion of the rugged structure portion 8 is the isosceles-triangular shape in cross section, however, it is not limited to this, and it may be a triangular shape in which two edges included in the triangle are different lengths. It is also preferable that the rugged structure portion 8 of the light control member 5 is formed by combining plural straight lines and curved lines as shown in FIG. 6 as well as formed by parts of conic curves as shown in FIG. 7. In FIG. 7, a proceeding state of light incident on the light control member 5 at an angle is shown by arrows.

It is not necessary that a cross-sectional shape of the rugged structure portion 8 has the same shape over the whole surface of the light control member 5, and plural cross-sectional shapes are mixed in the surface of the light control member 5. It is also preferable that a flat surface parallel to the reference surface 5a is interposed between a convex portion and a concave portion adjacent to each other or between adjacent convex portions in the cross-sectional shape of the rugged structure portion 8 according to the design. The interval of convex portions and concave portions is not always fixed but can be changed according to design.

In the first embodiment, the rugged structure portion 8 is provided only at the surface of the side facing the reflective member 4 among the two surfaces of the light control member 5, however, it is also preferable that the rugged structure portion 8 is provided only at the surface of the side facing the light sources 6 and the surface of the side facing the reflective member 4 is allowed to be the reference surface (flat surface) 5a.

When the rugged structure portion 8 is provided at the light sources 6 side of the light control member 5, the light control member 5 is arranged so as to be apart from the reflective surface 4 of the reflective member 4, as a result, a gap is imposed between them by the interval size. On the other hand, as in the first embodiment, in the case that the rugged structure portion 8 is provided at the reflective member 4 side of the light control member 5, the gap 9 is interposed between the reflective member 4 and the light control member 5 even when apexes of the convex portions of the rugged structure portion 8 are arranged so as to contact (line contact) the reflective member 4. Therefore, it is also preferable that the rugged structure portion 8 is provided at the reflective member 4 side of the light control member 5 in order to allow the surface light control device 3 to be thinner. In the case that the rugged structure portion 8 is provided at the light sources 6 side of the light control member 5, it is necessary to secure a gap by avoiding optical contact between the surface of the light control member 5 and the reflective member 4. Accordingly, it is desirable that one of the reflective surface 4a of the reflective member 4 and the reference surface 5a of the light control member 5 is made to be a rough surface. When the reference surface 5a of the light control member 5 is made to be the rough surface, there is a case in which reflected light is unnecessarily scattered as well as total reflection conditions are not satisfied. Therefore, it is desirable that the reflective surface 4a of the reflective member 4 is made to be the rough surface. A method of making the surface rough, for example, a method of scattering minute particles on the surface, a method of setting a thin film in which minute particles are mixed, a method of making the surface rough using sandblast and the like can be considered, however, it is limited to them because the purpose is to prevent optical contact.

It is preferable that the optimum design of the rugged structure portion 8 is made according to on which surface the rugged structure portion 8 is provided. For example, when comparing a case in which the rugged structure portion 8 is provided at the reflective member 4 side and a case in which rugged structure portion 8 is provided at the light sources 6 side, it is preferable that the apex angle of the convex portion in the rugged structure portion 8 is set to be larger in the latter case. For example, assume that the apex angle of the convex portion when the rugged structure portion 8 is provided at the reflective member 4 side is 130 degrees, the apex angle of the convex portion when rugged structure portion 8 is provided at the light sources 6 side is preferably set to be an angle larger than 130 degrees, for example, 155 degrees. These variables can be appropriately selected according to design and manufacturing. Additionally, the rugged structure portion 8 may be provided at both sides of the reflective member 4 and the light sources 6 (both sides of the light control member 5).

Figure 9:
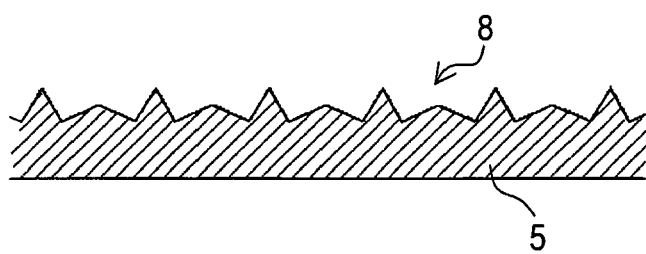
FIG. 9 is a view showing a shape example of the rugged structure portion.
Figure 10:
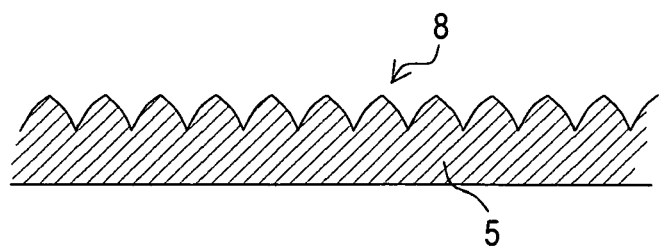
FIG. 10 is a view showing a shape example of the rugged structure portion.
Figure 11A:
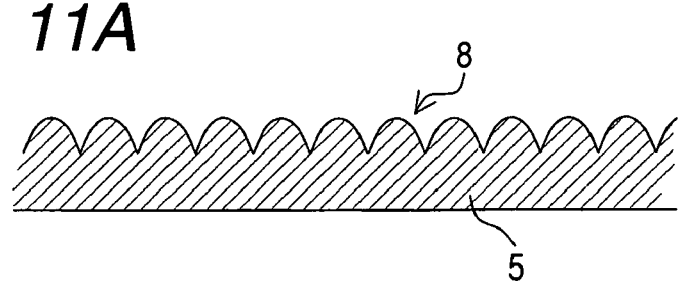
FIG. 11A and FIG. 11B are views showing shape examples of the rugged structure portion.
Figure 11B:
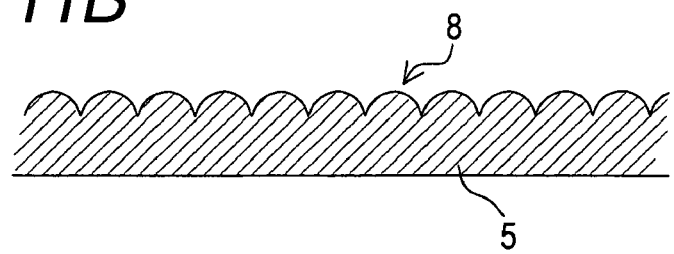

The cross-sectional shape of the convex portions in the rugged structure portion 8 may be formed in a state in which two kinds (or three kinds or more) of triangles having different apex angles are aligned as shown in FIG. 9, or may be formed in a state in which approximate triangles are formed by curved surfaces (state in which respective apexes of triangles having convex and concave shapes are connected by arcs) as shown in FIG. 10. It is also preferable to apply a state in which the cross-sectional shape of the convex portion is formed by part of a parabola or an ellipse as shown in FIG. 11A, and it is preferable to apply a state in which the cross-sectional shape of the convex portion is formed by a semi-circle as shown in FIG. 11B.

The light repeatedly reflecting inside the light control member 5 has directivity close to the specular reflection, and the directivity is not usually desirable as the surface light source device 3. Accordingly, some kind of a light scattering member can be added to the light control member 5. The light scattering member may be implemented as, for example, a scattering function exerted by applying a sandblast process to or fixing minute beads to the reference surface 5a of the light control member 5. It is also possible to mix a light scattering material into the light control member 5. In the case that the light scattering member is added to the light control member 5 as described above, improvement of display quality due to the light scattering member can be expected though the light-guiding function by the rugged structure portion 8 is reduced.

Figure 12:
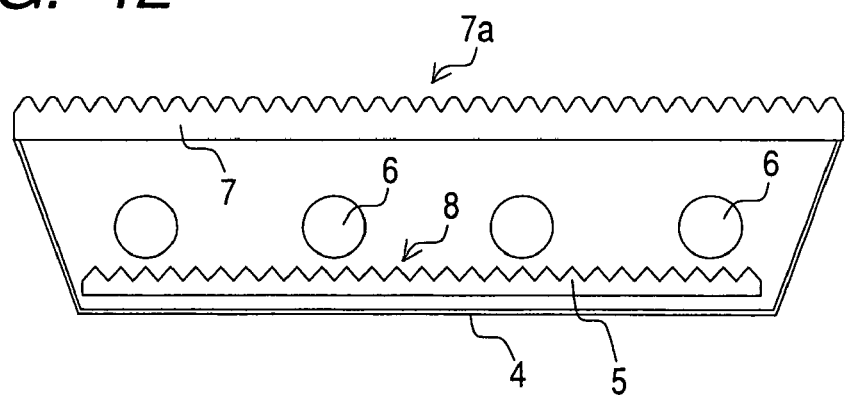
FIG. 12 is a view explaining an application example of the first embodiment of the invention.
Figure 13:
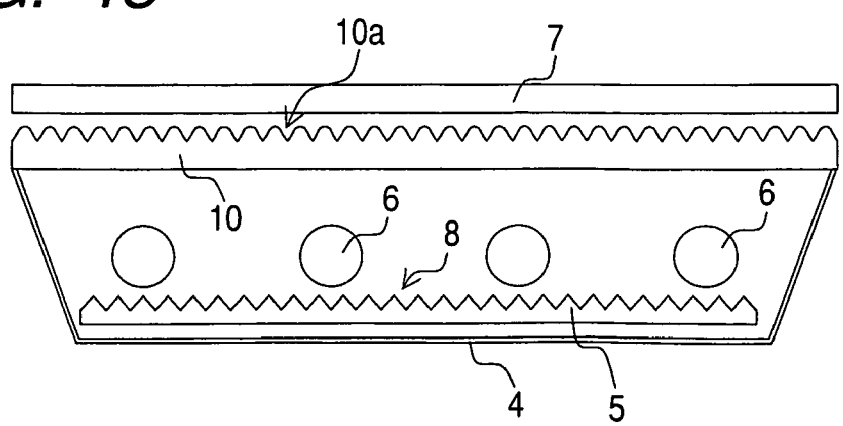
FIG. 13 is a view explaining an application example of the first embodiment of the invention.

FIG. 12 and FIG. 13 are views explaining application examples of the first embodiment of the invention. In the application example shown in FIG. 12, as a structure of the surface light source device, a structure in which a rugged structure portion 7a which functions as a prism is provided at one surface of the diffusing member 7 having a flat plate shape and the light control member 5 is provided between the light sources 6 and the reflective member 4 in combination with the diffusing member 7 is applied. In the application example shown in FIG. 13, a structure in which a prism sheet 10 having a rugged structure portion 10a which functions as a prism is provided between the light sources 6 and the diffusing member 7 and the light control member 5 is provided between the light sources 6 and the reflective member 4 in combination with the prism sheet 10 is applied.

Figure 14:
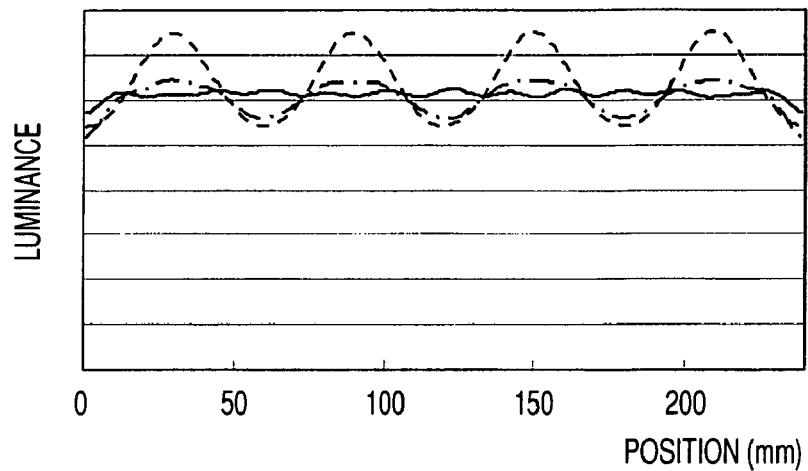
FIG. 14 is results of simulation for luminance distribution of the surface light source device.

FIG. 14 is a view showing results of simulation for luminance distribution of the surface light source device, in which the vertical axis represents luminance and the horizontal axis represents positions of light sources in the alignment direction. Here, simulation results when four light sources are aligned at fixed intervals.

In the drawing, a dotted line represents luminance distribution when the diffusing member 7 not having the rugged structure portion 7a is provided without the light control member 5 and the prism sheet 10. A dot-dash line represents luminance distribution when the prism sheet 10 is provided without the light control member 5, or when the diffusing member 7 having the rugged structure portion 7a is provided. A solid line represents luminance distribution when the prism sheet 10 is provided with the optical control member 5, or when the diffusing member 7 having rugged structure portion 7a is provided. As can be seen from the simulation results, it is possible to suppress luminance variation to some degree when the rugged structure portion 7a is provided at the diffusing member 7 or when the prism sheet 10 is provided between the light sources 6 and the diffusing member 7. However, difference between the maximum value of luminance appearing at a position of the light source 6 and the minimum value of luminance appearing between two light sources 6 which are adjacent in the alignment direction is still distinct. On the other hand, when the light control member 5 is provided, such luminance difference is cancelled out, and correlation between luminance distribution and light-source positions is low. Accordingly, respective light sources 6 do not tend to be recognized as lamp images and the device can be thinner in thickness.

Figure 15:
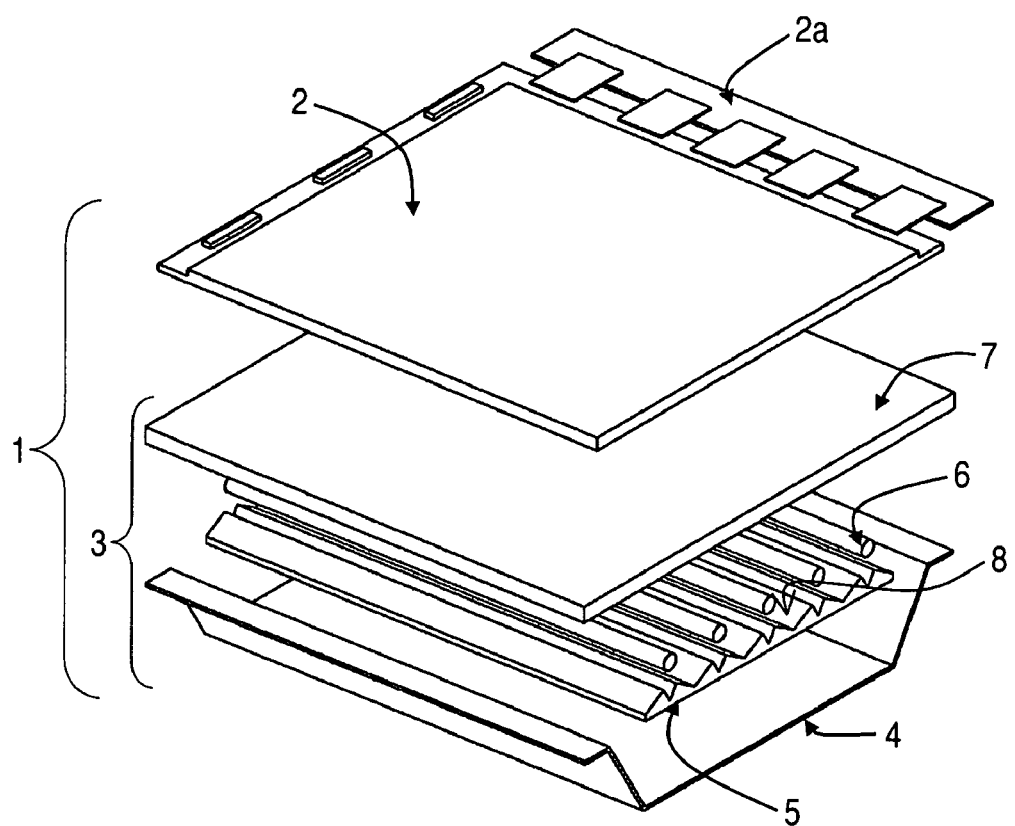
FIG. 15 is an exploded perspective view showing a structure of an image display device according to a second embodiment of the invention.
Figure 16:
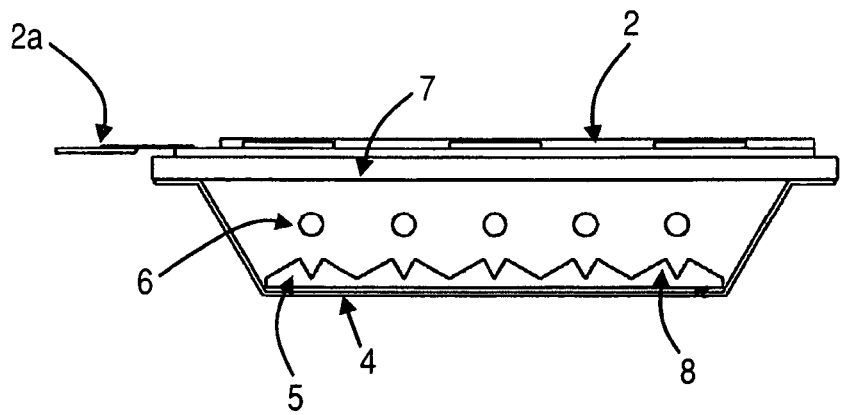
FIG. 16 is a side view showing the structure of the image display device according to the second embodiment of the invention.

FIG. 15 is an exploded perspective view showing a structure of an image display device according to a second embodiment of the invention, and FIG. 16 is a side view showing the structure of the image display device. The second embodiment differs from the first embodiment particularly in the rugged structure portion 8 of the light control member 5. Here, the light control member 5 having the rugged structure portion 8 at an surface of the side facing the light sources 6 is shown as an example.

Figure 17:
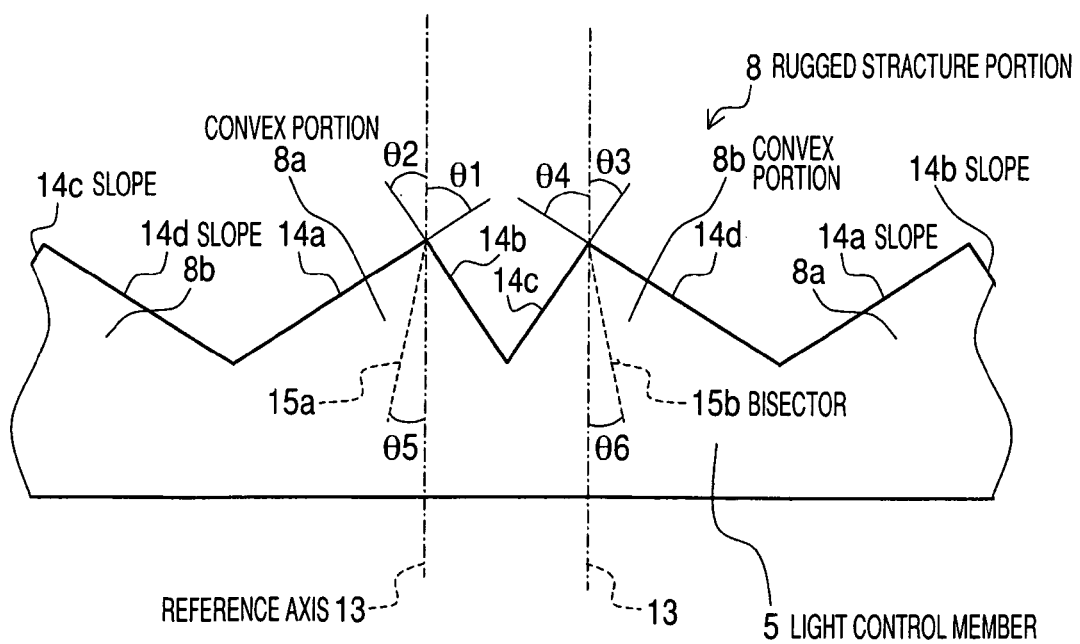
FIG. 17 is a sectional side view in which part of the rugged structure portion of the light control member applied in the second embodiment of the invention is enlarged.

FIG. 17 is a sectional side view in which part of the rugged structure portion 8 of the light control member 5 applied in the second embodiment of the invention is enlarged. As shown in the drawing, a cross-sectional shape of the convex portion in the rugged structure portion 8 is a triangular shape. Convex portions and concave portions in the rugged structure portion 8 are formed including a first slope 14a, a second slope 14b, a third slope 14c and a fourth slope 14d respectively having different inclination angles $\theta 1$, $\theta 2$, $\theta 3$, and $\theta 4$ with respect to a reference axis 13. The first slope 14a inclines with respect to the reference axis 13 at the angle $\theta 1$ and the second slope 14b inclines with respect to the reference axis 13 at the angle $\theta 2$. The third slope 14c inclines with respect to the reference axis 13 at the angle $\theta 3$ and the fourth slope 14d inclines with respect to the reference axis 13 at the angle $\theta 4$. The "reference axis" described in the specification indicates an axis which is perpendicular to a virtual plane parallel to the light emitting surface of the diffusing member 17.

The above four slopes 14a, 14b, 14c and 14d are formed continuously in the alignment direction of the above-described light sources 6 (right-and-left direction in FIG. 17) in the fixed order ( . . . 14c→14d→14a→14b→14c→14d→14a→14b . . . ) in a repeated manner. In these slopes, the first slope 14a and the second slope 14b adjacent to each other in the alignment direction of the light sources 6 form one convex portion 8a having a triangular shape in cross section, and the third slope 14c and the fourth slope 14d also form one convex portion 8b having a triangular shape in cross section. In the alignment direction of the light sources 6, the rugged structure portion 8 is formed in a state in which the convex portion 8a having the triangular shape in cross section which includes the first slope 14a and the second slope 14b and the convex portion 8b having the triangular shape in cross section which includes the third slope 14c and the fourth slope 14d are alternately aligned in a repeated manner at an interval of, for example, 0.1 mm. The convex portions 8a, 8b having the triangular shape in cross section with inclination angles with respect to the reference angle 13 can be applied to all convex portions in the rugged structure portion 8, or can be applied to part of the convex portions. In this case, the convex portions 8a, 8b having the triangular shape in cross section with inclination angles with respect to the reference axis 13 are formed continuously in the alignment direction of the light sources 6 in a repeated manner as an example. However, it is not limited to this, and it is also preferable that the convex portions 8a, 8b are formed every other portion or every plural portions in a repeated manner in a state of sandwiching convex portions having a triangular shape without a inclination angle with respect to the reference axis 13.

The inclination angle $\theta 1$ of the first slope 14a and the inclination angle $\theta 4$ of the fourth slope 14d are the same angle ($\theta 1 = \theta 4$). However, inclination directions of the first slope 14a and the inclination direction of the fourth slope 14d are opposite with respect to the reference axis 13. Specifically, the first slope 14a inclines in a clockwise direction in the drawing from the reference axis 13 at the angle $\theta 1$, and the fourth slope 14d inclines in a counterclockwise direction in the drawing from the reference axis 13 at the angle $\theta 4$.

The inclination angle $\theta 2$ of the second slope 14b and the inclination angle $\theta 3$ of the third slope 14c are the same angle ($\theta 2 = \theta 3$). However, the inclination direction of the second slope 14b and the inclination direction of the third slope 14c are opposite with respect to the reference axis 13. Specifically, the second slope 14b inclines in a clockwise direction in the drawing from the reference axis 13 at the angle $\theta 2$, and the third slope 14c inclines in a counterclockwise direction in the drawing from the reference axis 13 at the angle $\theta 3$.

The inclination angles $\theta 1$, $\theta 4$ of the first slope 14a and the fourth slope 14d are set to be a larger angle than the inclination angles $\theta 2$, $\theta 3$ of the second slope 14b and the third slope 14c. Additionally, an angle formed by the first slope 14a and the second slope 14b and an angle formed by the third slope 14c and the fourth slope 14d are set to be the same angle respectively (approximately 90 degrees in the example of the drawing).

A bisector 15a of the angle formed by the first slope 14a and the second slope 14b inclines with respect to the reference axis 13 by an angle $\theta 5$, and a bisector 15b of the angle formed by the third slope 14c and the fourth slope 14d inclines with respect to the reference axis 13 by an angle $\theta 6$. The angle $\theta 5$ and the angle $\theta 6$ are set to be the same angle. Therefore, the convex portion 8a having the triangular shape in cross section with the inclination angle $\theta 5$ and the convex portion 8b having the triangular shape in cross section with the inclination angle $\theta 6$ are formed aligned alternately in the alignment direction of the light sources 6 as described above. The bisector 15a of one angle inclines with respect to the reference axis 13 at the angle $\theta 5$ in the clockwise direction in the drawing and the bisector 15b of the other angle inclines with respect to the reference axis 13 at the angle $\theta 6$ in the counterclockwise direction in the drawing. The inclination angles $\theta 5$, $\theta 6$ of the bisectors 15a, 15b are set to be the optimum value satisfying various conditions such as arrangement of the light sources 6, for example, a value of 5 degrees of less, more particularly, a value of 2 as well as more and 3 or less under a condition (angle range) that the value is larger than 0 degree as well as smaller than 90 degree.

A dent portion having a V-shape in cross section formed by the first slope 14a and the fourth slope 14d and a dent portion having a V-shape in cross section formed by the second slope 14b and the third slope 14c respectively correspond to concave portions of the rugged structure portion 8. In the case that a reference axis passing through a portion of a valley of the concave portion (the most dented portion) of the rugged structure portion 8 is set in a virtual manner, the convex portion 8a and the convex portion 8b which form the triangular shape in cross section respectively are formed to have positional relationship of line symmetry with the virtual reference axis as an axis of symmetry.

Figure 18:
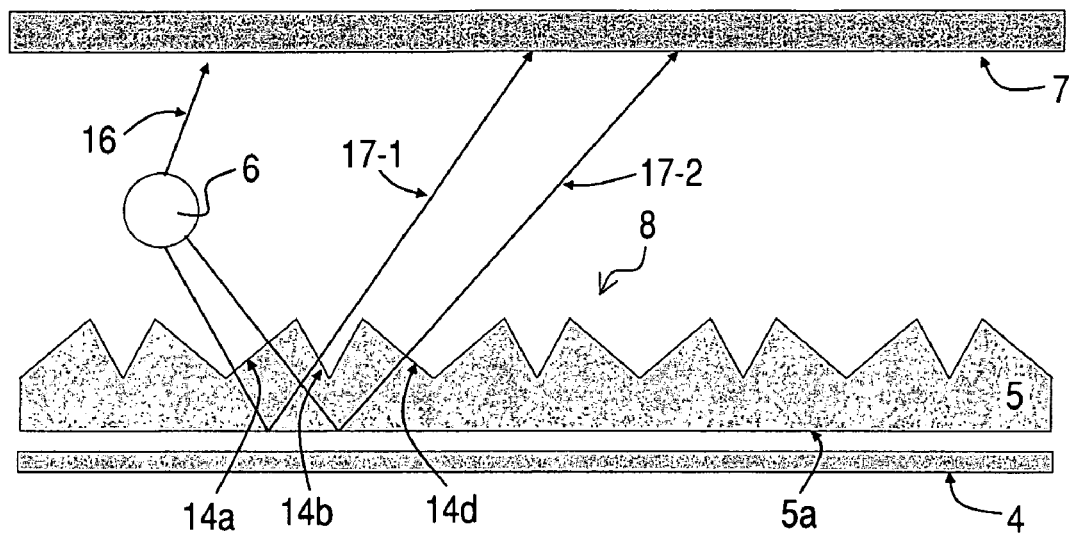
FIG. 18 is a view explaining functions of the light control member according to the second embodiment of the invention.

FIG. 18 is a view explaining functions of the light control member according to the second embodiment of the invention. As shown in the drawing, light emitted from the light source 6 of the surface light source device 3 is divided into a light 16 which is directly incident on the diffusing member 7 and a light 17 which is directly incident on the light control member 5. In these lights, the light 16 directly incident on the diffusing member 7 from the light source 6 is incident on the display panel 2 in a state of being diffused at the diffusing member 7. Lights 17-1, 17-2 which are directly incident on the light control member 5 from the light source 6 are incident on the diffusing member 7 in a state in which luminous flux amounts are uniformed in a virtual plane in which plural light sources 6 are aligned by the light-guiding function of the light control member 5 which is described below.

First, the lights 17-1, 17-2 which are directly incident on the light control member 5 from the light source 6 is incident on the first slope 14a of the light control member 5 and enters into the light control member 5. The lights 17-1, 17-2 entered in the light control member 5 in the above manner are totally reflected at the reference surface 5a of the light control member 5. Then, one light 17-1 in the lights 17-1, 17-2 which have been totally reflected is emitted outside the light control member 5 from the second slope 14b, and the other light 17-2 is emitted outside the light control member 5 from the fourth slope 14d. That is, the lights 17-1, 17-2 entered from the same first slope 14a to the light control member 5 are totally reflected at the reference surface 5a, then, emitted from the slopes 14b, 14d which are different from each other. Accordingly, the lights 17-1, 17-2 are emitted to the diffusing member 7 in a form of being separated from each other due to refraction phenomenon of light at the emission interface (difference of refraction index) and the like. This point is the same for light emitted from another light source 6.

Figure 19:
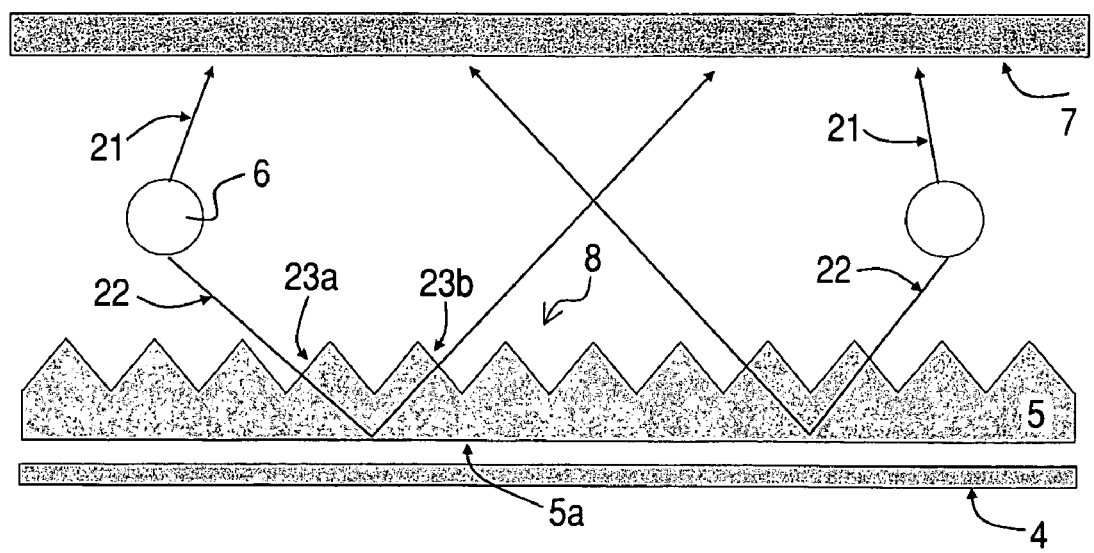
FIG. 19 is a view explaining functions of the light control member when a convex portion of the rugged structure portion is made to be an isosceles-triangular shape in cross section.

On the other hand, when cross-sectional shapes of the convex portions in the rugged structure portion 8 are formed to have the same isosceles-triangular shape as shown, for example, FIG. 19, light emitted from each light source 6 is roughly divided into a light 21 which is directly incident on the diffusing member 7 and a light 22 which is directly incident on the light control member 5. In these lights, the light 21 which is directly incident on the diffusing member 7 from the light source 6 is incident on the display panel 2 in a state of being diffused at the diffusing member 7. The light 22 which is directly incident on the light control member 5 from the light source 6 is incident from one slope 23a of the light control member 5 and enters into the light control member 5. Accordingly, the light 22 entered in the light control member 5 is totally reflected at the reference surface 5a of the light control member 5. Then, the light 22 which has been totally reflected is emitted outside the light control member 5 from another slope 23b of the light control member 5 (which is different from the slope at the time of entering). As described above, the light control member 5 changes the proceeding direction of light by using the total reflection phenomenon. Therefore, the light guided in the light control member 5 is reflected in a manner of specular reflection and is incident on the diffusing member 7 at a position apart from the light source 6.

Figure 20:
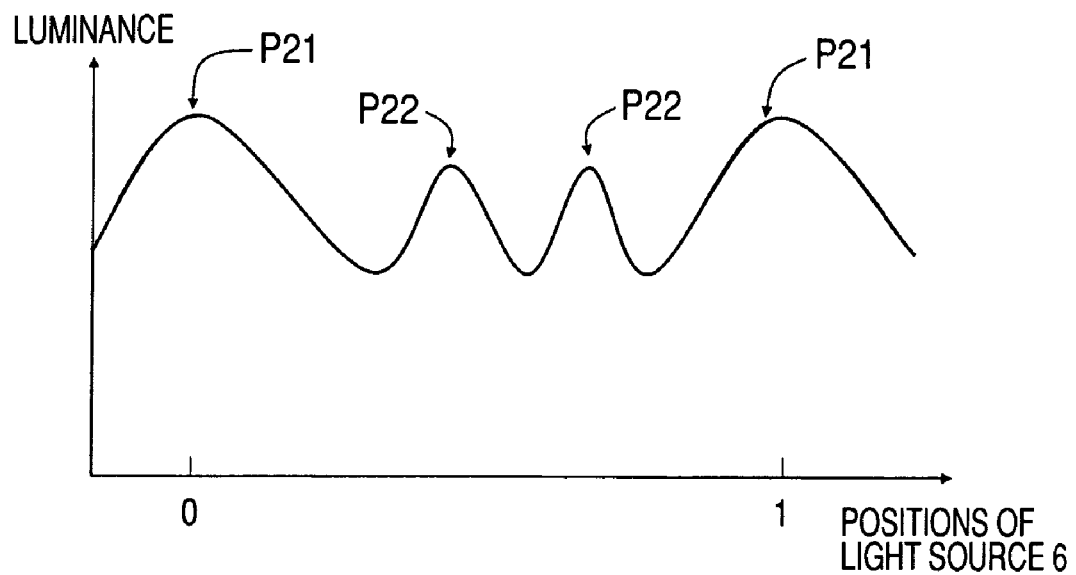
FIG. 20 is a chart showing luminance distribution of light taken from a light emitting surface of the diffusing member by using the light control member shown in FIG. 19.

FIG. 20 is a chart showing luminance distribution of light taken from the light emitting surface of the diffusing member 7 by using the light control member 5 shown in FIG. 19. The lights 21, 21 which are directly incident on the diffusing member 7 from respective light sources 6 make luminance peaks P21, P21 appear at positions corresponding to positions of respective corresponding light sources 6. The lights 22, 22 reflected in a manner of specular reflection by the light control member 5 make two luminance peaks P22, P22 between the two light sources 6, respectively. Therefore, when the light control member 5 shown in FIG. 19 is used, two luminance peaks exist between adjacent light sources 6. The phenomenon similarly occurs also when the rugged structure portion 8 is provided at the surface of the side facing the reflective member 4. In the case that the distance between light sources is relatively small or in the case that the thickness of the whole device is large, four luminance peaks are close to one another or become wide, therefore, they are mingled and relatively uniform display quality can be obtained. On the other hand, in the case that the distance between light sources is large or in the case that the thickness of the whole device is small, four luminance peaks are separated, therefore, they are not mingled, as a result, they are tend to be recognized as lamp images.

Figure 21:
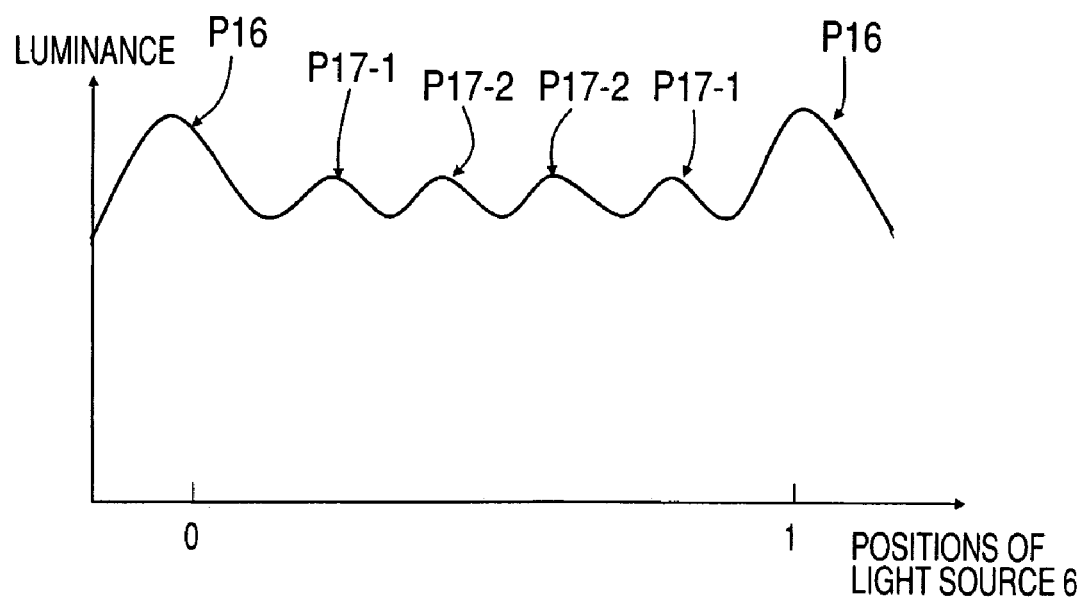
FIG. 21 is a chart showing luminance distribution of light taken from the light emitting surface of the diffusing member by using the light control member shown in FIG. 17 and FIG. 18.

FIG. 21 is a chart showing luminance distribution of light taken from the light emitting surface of the diffusing member 7 by using the light control member 5 shown in FIG. 17 and FIG. 18. In this case, the point that luminance peaks P16, P16 appear at positions corresponding to positions of light sources 6 by the light 16 which is directly incident on the diffusing member 7 from the light source 6 is the same as the above. However, the lights 17-1, 17-2 which are directly incident on the light control member 5 from the light source 6 are incident on the diffusing member 7 separately from the light control member 5. Therefore, luminance peaks P17-1, P17-2 obtained by dividing light which is incident from one light source by the light-guiding function of the light control member 5 and emitting the lights and luminance peaks P17-1, P17-2 obtained by dividing light which is incident from the other light source by the light-guiding function of the light control member 5 and emitting the lights appear between adjacent two light sources. That is to say, four luminance peaks are allowed to appear between adjacent two light sources. Therefore, even when the distance between light sources is large or when the thickness of the whole device is small, many luminance peaks can be mingled. As a result, uniformity of luminance can be improved particularly in the thin image display device.

Figure 22:
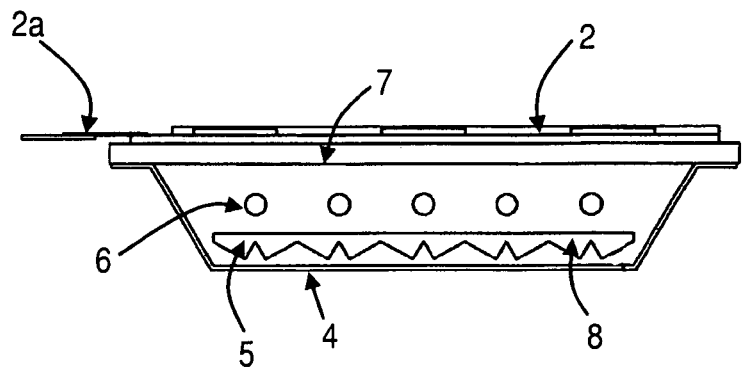
FIG. 22 is a side view showing another structure of the image display device according to the second embodiment of the invention.

FIG. 22 is a side view showing another structure of the image display device according to the second embodiment of the invention. The shown image display device has a structure in which the light control member 5 having the rugged structure portion 8 on the surface of the side facing the reflective member 4 is provided which is the same as the one of FIG. 17. In the case of applying the structure, it is possible to allow four luminance peaks to appear between adjacent two light sources.

Figure 23:
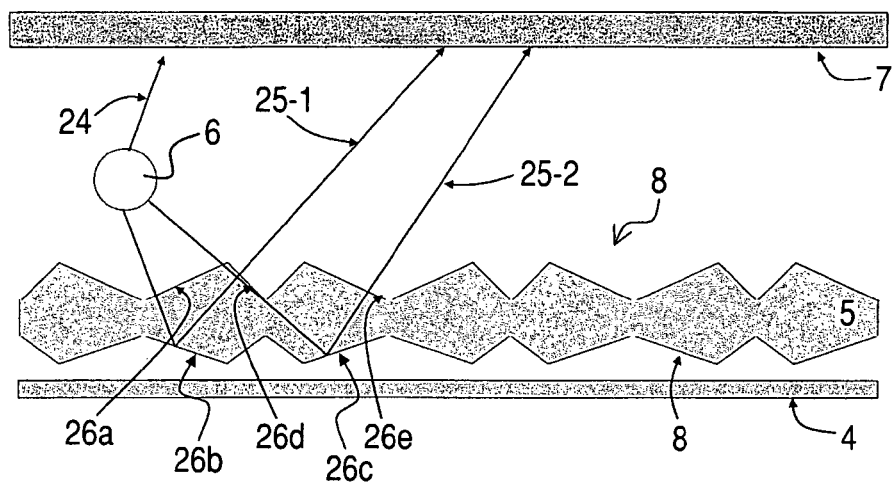
FIG. 23 is a side view showing another structure of the image display device according to the second embodiment of the invention.

In a structure example of the image display device shown in FIG. 23, the light control member 5 having rugged structure portions 8 which are the same as the one of FIG. 17 on both the surface of the side facing the reflective member 4 and the surface of the side facing the light sources 6, namely, on both sides is provided. In the case of applying such structure, light emitted from the light source 6 is roughly divided into a light 24 which is directly incident on the diffusing member 7 and lights 25-1, 25-2 which are directly incident on the light control member 5. In these lights, the light 24 which is directly incident on the light diffusing member 7 from the light source 6 is incident on the display panel 2 in a state of being diffused at the diffusing member 7. On the other hand, the lights 25-1, 25-2 which are directly incident on the light control member 5 from the light source 6 are incident on a slope 26a at an upper side of the light control member 5 and enter into the light control member 5. The lights 25-1, 25-2 entered in the light control member 5 are totally reflected at slopes 26b, 26c at a lower side of the light control member 5. Then, the light 25-1 which has been totally reflected at the slope 26b is emitted outside the light control member 5 from a slope 26d at the upper side, and the light 25-2 which has been totally reflected at the slope 26c is emitted outside the light control member 5 from a slope 26e at the upper side. That is, the lights 25-1, 25-2 which have been incident on the light control member 5 from the same slope 26a are totally reflected at the different slopes 26b, 26c respectively, then, emitted from the different slopes 26d, 26e respectively. Accordingly, the lights 25-1, 25-2 are emitted toward the diffusing member 7 in a form of being separated from each other. Therefore, it is possible to allow four luminance peaks to appear between adjacent two light sources in the same manner as the above, which improves uniformity of luminance.

Figure 24:
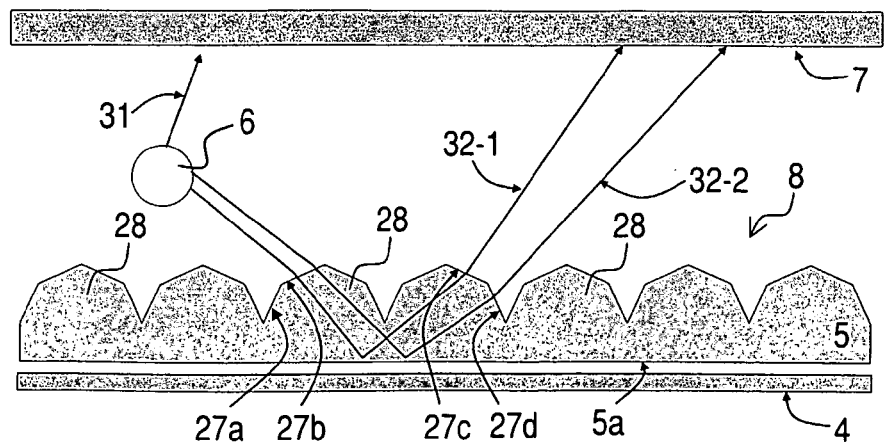
FIG. 24 is a side view showing another structure of the image display device according to the second embodiment of the invention.

In a structure example of the image display device shown in FIG. 24, a convex portion 28 of the rugged structure portion 8 is formed to be a pentagonal shape in cross section including four slopes 27a, 27b, 27c and 27d in the light control member 5 having the rugged structure portion 8 at the surface of the side facing the light sources 6. The convex portions 28 are formed continuously without a gap in a repeated manner in the alignment direction of the light sources 6 (right-and-left direction in the drawing). When a reference axis passing through an angle (an apex of the convex portion) formed by the slope 27a and the slope 27b is set in a virtual manner, each convex portion 28 is formed to be a figure which is a line symmetry with the virtual reference axis as an axis of symmetry. When such structure is applied, light emitted from the light source 6 is roughly divided into a light 31 which is directly incident on the diffusing member 7 and lights 32-1, 32-2 which are directly incident on the light control member 5. In these lights, the light 31 which is directly incident on the diffusing member 7 from the light source 6 is incident on the display panel 2 in a state of being diffused at the diffusing member 7. On the other hand, the lights 32-1, 32-2 which are directly incident on the light control member 5 from the light source 6 are incident on the slope 27b of the convex portion 28 and enter into the light control member 5. The lights 32-1, 32-2 entered into the light control member 5 as described above are totally reflected on the reference surface 5a of the light control member 5. Then, the lights 32-1, 32-2 which have been totally reflected are emitted outside the light control member 5 from the slope 27c and the slope 27d respectively. That is, the lights 32-1, 32-2 which have been incident on the light control member 5 from the same slope 27a are totally reflected on the reference surface 5a, then, emitted from different slopes 27c, 27d respectively. Accordingly, the lights 32-1, 32-2 are emitted toward the diffusing member 7 in a form of being separated from each other. Therefore, it is possible to allow four luminance peaks to appear between adjacent two light sources in the same manner as described above, which can improve uniformity of luminance.

When kinds of slopes forming the convex portion of the rugged structure portion 8 are increased and the sectional shape of the convex portion is made to be a polygonal shape, it is possible to divide light to be emitted to the diffusing member 7 from the light control member 5 in accordance with the kinds of slopes. Therefore, the number of luminance peaks between light sources can be increased, and these peaks are mingled to thereby improve the uniformity of luminance. However, in the case that the sectional shape of the convex structure portion 8 is made to be a polygonal shape, when the sectional shape is close to a semicircle or an ellipse, the luminance peak appearing between light sources becomes small. Therefore, optimization of the light control member 5 is necessary, however, it is included within freedom of design.

Figure 25:
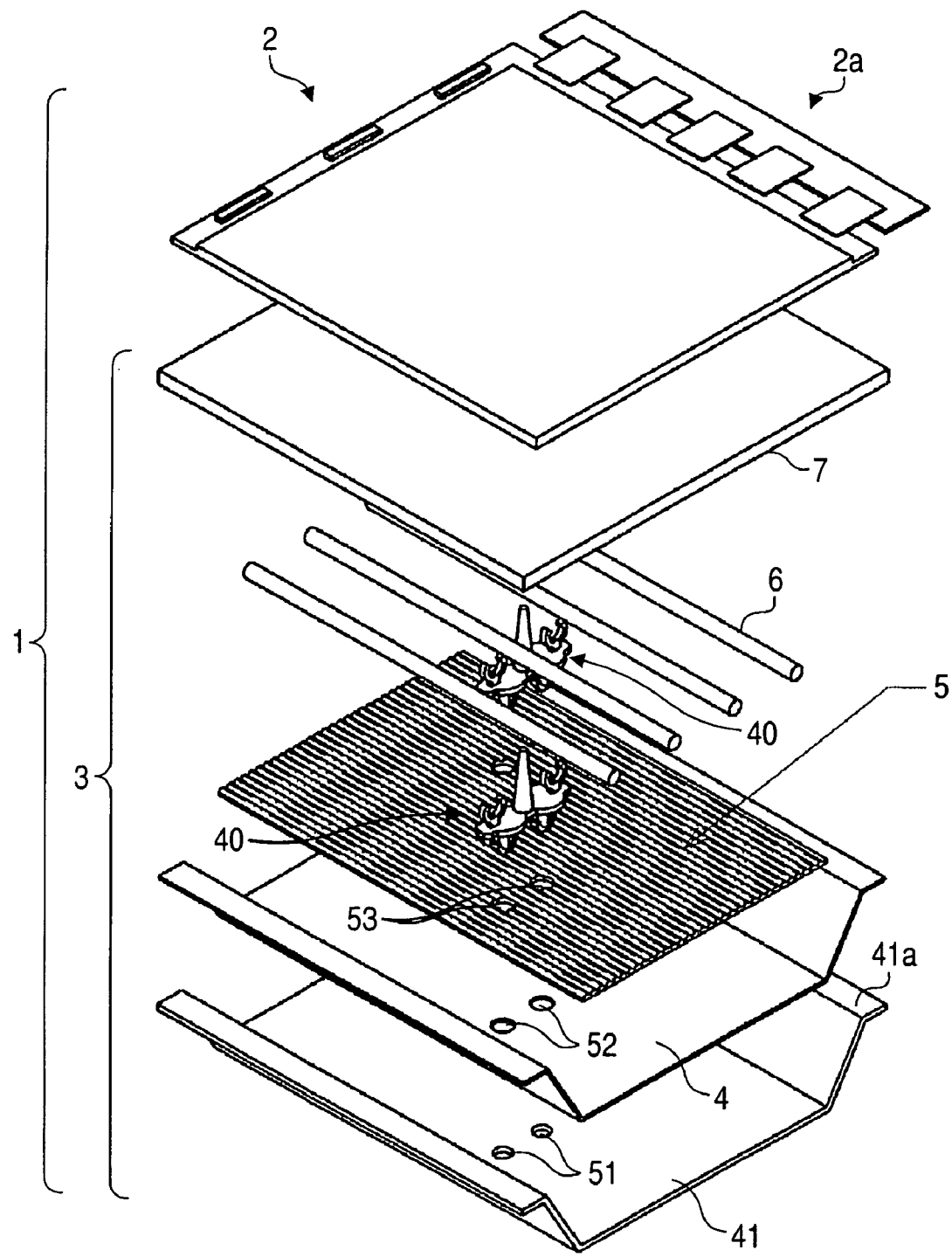
FIG. 25 is an exploded perspective view showing a first structure example of an image display device according to a third embodiment of the invention.
Figure 26:
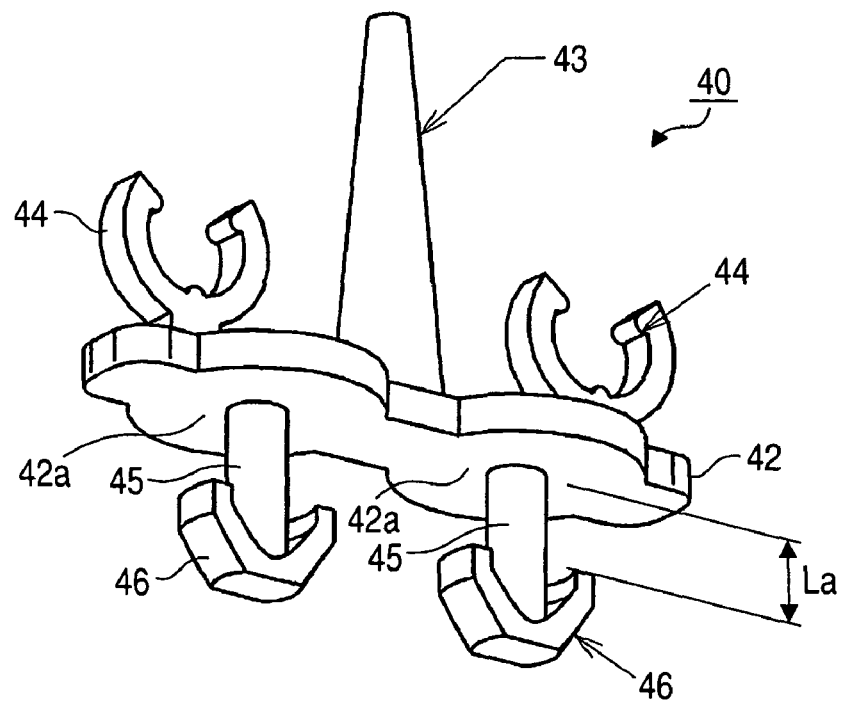
FIG. 26 is a perspective view showing a structure of a fixing member according to the first structure example.
Figure 27:
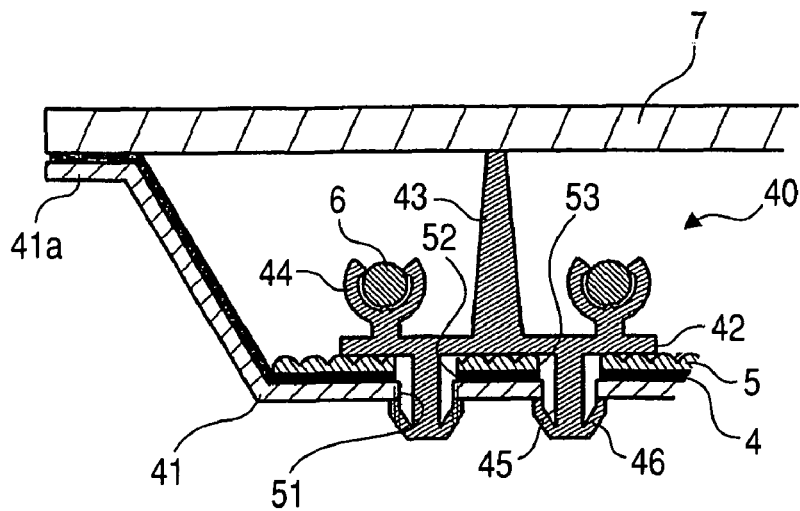
FIG. 27 is a sectional side view showing a fixing state of the fixing member in the first structure example.

FIG. 25 is an exploded perspective view showing a first structure example of an image display device according to a third embodiment of the invention. The third embodiment has a structure, particularly as a structure of the surface light source device 3, in which the reflective member 4 and the light control member 5 are fixed to a casing 41 by using plural fixing members 40 (only two member are shown in the drawing for convenience). FIG. 26 is a perspective view showing a structure of the fixing member 40 in the first structure example. FIG. 27 is a sectional side view showing a fixing state of the fixing member 40 in the first structure example.

The fixing member 40 is obtained by molding, for example, a white resin material. As a material, for example, a white pigment is mixed into polycarbonate can be used. However, other resin materials can be also used. The fixing member 40 roughly includes a base portion 42, a column portion 43, two light-source fixing portions 44, two pin portions 45, and two expand/contract portions (locking portion) 46, which are integrally formed. The base portion 42 is formed to have a flat-plate having a shape of glasses in plan view, which has two lid portions 42a expanded in approximately circular shapes. The column portion 43 is provided at the center of the base portion 42 in the longitudinal direction in a state of standing vertically from one surface of the base portion 42. An outer diameter of the column portion 43 is gradually decreasing toward a tip thereof.

The two light-source fixing portions 44 are provided at both sides of the column portion 43 in the longitudinal direction of the base portion 42. Each light-source fixing portion 44 is formed to be an approximately C-shape in a size corresponding to an outer diameter of the light source 6 having a cylindrical shape. At the inside of the C-shape portion of the light-source fixing portion 44, small projections are provided at three points. The two pin portions 45 are provided in a state of standing vertically in the opposite direction to the column portion 43 from the other surface of the base portion 42. Each of the two pin portions 45 is provided also in a state of protruding from the center of the corresponding lid portion 42a respectively. Each of the two expand/contract portions 46 is provided at a tip portion of the corresponding pin portion 45 respectively. The expand/contract portion 46 is formed so as to be elastically deformed in a direction in which the outer diameter thereof expands/contracts. The outer diameter of the expand/contract portion 46 is set to be larger than an outer diameter of the pin portion 45.

The casing 41 is provided so as to enclose the reflective member 4, the light control member 5, the light sources 6 and the like. The casing 41 is formed to have a wing-shape in side view, and the reflective member 4 is formed so as to correspond to the wing-shape. Accordingly, an inner surface of the casing 41 is covered with the reflective member 4. Since the casing 41 will be a member which holds strength of the surface light source device 3, the casing 41 is obtained by, for example, pressing a metal thin plate in order to increase strength as well as to let out heat generated by the light sources 6 to the outside efficiently. However, it is not limited to this, and the casing 41 may be formed by resin.

At the casing 41, the sheet-type reflective member 4 which is stacked thereon and the sheet type light control member 5 which is stacked further thereon, pairs of piercing holes 51, 52 and 53 are provided at plural positions (only two positions are shown in the drawing for convenience) in respective corresponding portions. The "corresponding portions" described here indicate portions in which piercing holes are arranged overlapped one another concentrically when the casing 41, the reflective member 4 and the light control member 5 are stacked. A diameter of the piercing holes 51 of the casing 41 is set to be smaller than a diameter of the piercing holes 52 of the reflective member 4, and a diameter of the piercing holes 53 of the light control member 5 is set to be the same diameter as the diameter of the piercing holes 52 of the reflective member 4. In addition, the diameter of the piercing holes 51 of the casing 41 is set to be larger than an outer diameter of the pin portions 45 of the fixing member 40 as well as to be smaller than an outer diameter of the expand/contract portions 46.

When the reflective member 4 and the light control member 5 are actually fixed to the casing 41 by using the fixing member 40, first, the reflective member 4 is overlapped so as to be fitted into the casing 41. At this time, the reflective member 4 and the casing 41 are positioned so that the piercing holes 51, 52 are concentrically arranged. Next, the light control member 5 is overlapped on the reflective member 4. Also in this case, the light control member 5 is positioned with respect to the fixing member 40 and the reflective member 4 so that the piercing holes 51, 52 and 53 are concentrically arranged. In the above state, the pin portions 45 provided at the fixing member 40 and the expand/contract portions 46 at the tips thereof are inserted (pressed) into the piercing holes 51, 52 and 53 from the light control member 5 side. Then, the outer diameters of the expand/contract portions 46 are contrasted once by elastic deformation, and the expand/contract portions 46 protrude at the outer surface side of the casing 41 through the piercing holes 51, 52 and 53. Next, the base portion 42 of the fixing member 40 is strongly pushed to the light control member 5, and the expand/contract portions 46 passes through the piercing holes 51, 52 and 53 completely and the outer diameters of the expand/contract portions 46 expand to the original size with release of the elastic deformation at the moment. Therefore, the expand/contract portions 46 of the fixing member 40 is in the state of being locked at the outer surface of the casing 41. That is, the expand/contract portions 46 which are portions as "barbs" are hooked at the outer surface of the casing 41. Accordingly, the pin portions 45 of the fixing member 40 can be prevented from being extracted positively.

The light control member 5, the reflective member 4 and the casing 41 having the stacked structure are sandwiched between the base portion 42 and the expand/contract portions 46 of the fixing member 40. Therefore, when sizes of respective members are set so that the total thickness size in which the light control member 5, the reflective member 4 and the casing 41 are added up becomes slightly larger than a space size La between the base portion 42 and the expand/contract portions 46, the base portion 42 bites the light control member 5 due to the above pressing force. Accordingly, the light control member 5, the reflective member 4 and the casing 41 are fixed together at points where the fixing members 40 are attached. However, at points where the fixing members 40 are not attached, a slight gap (thin air layer) is imposed between the reflection member 4 and the light control member 5.

After the fixing members 40 are attached as described above, the light sources 6 are installed at the light-source fixing portions 44. The installation of the light sources 6 can be performed before fixing the fixing portions 40. Next, the diffusing member 7 is attached so as to cover an upper space of the light sources 6. At this time, the tip portion of the column portion 43 abuts on the lower surface of the diffusing member 7 to thereby support the diffusing member 7 as well as to prescribe positional relationship of respective members (4, 5, 41, and 7) in the thickness direction of the surface light source device 3. The diffusing member 7 is installed in a form that a longitudinal portion thereof is put on a receiving portion 41a of the casing 41. On the receiving portion 41a of the casing 41, the diffusing layer 7 is put through the reflective member 4.

In the third embodiment of the invention, it is possible to fix the light control member 5 integrally with the reflective member 4 and the casing 41 by using the fixing members 40. Additionally, the expand/contract portions 46 are locked at the outer surface of the casing 41 in the state in which the base portion 42 of the fixing member 40 bites the light control member 5, therefore, it is possible to prevent the fixing member 40 from resonating due to the effect of vibration of a speaker and the like or generating abnormal noise. Additionally, the piercing holes 51, 52 and 53 provided at the casing 41, the reflective member 4 and the light control member 5 are completely filled by the lid portions 42a. Therefore, it is possible to prevent foreign substances from getting into the surface light source device 3 through the piercing holes 51, 52 and 53. In the case that the base portion 42 bites the light control member 5 to a degree that the rugged structure portion 8 of the light control member, is flatten, it is possible to prevent outside air from getting into the device.

Figure 28:
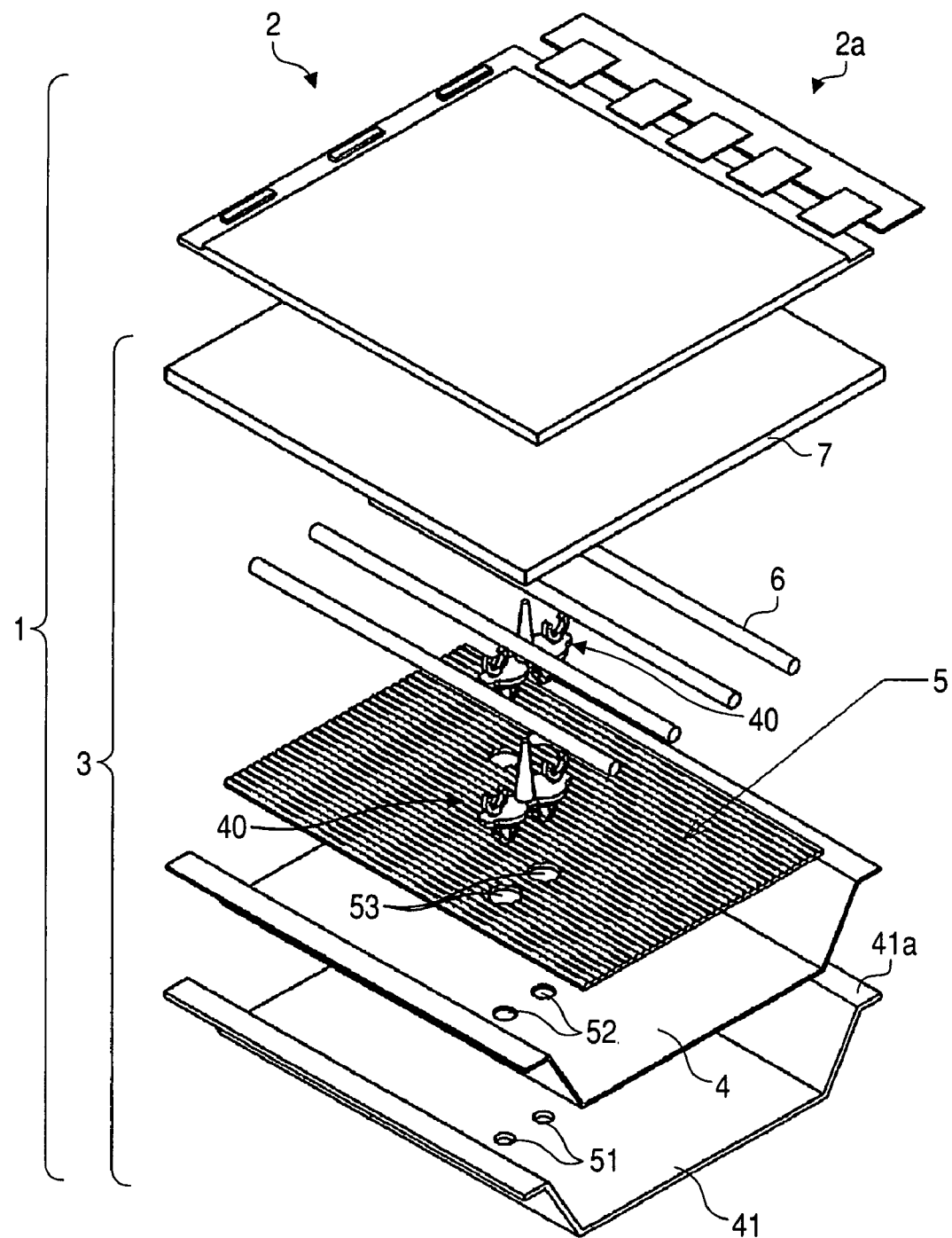
FIG. 28 is an exploded perspective view showing a second structure example of an image display device according to the third embodiment of the invention.
Figure 29:
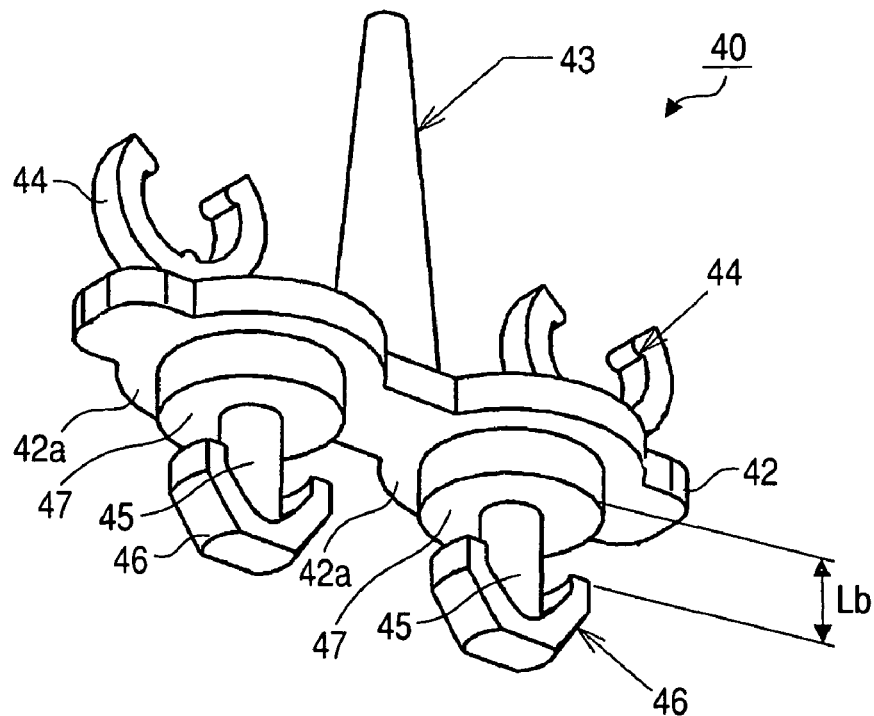
FIG. 29 is a perspective view showing a structure of the fixing member in the second structure example.
Figure 30:
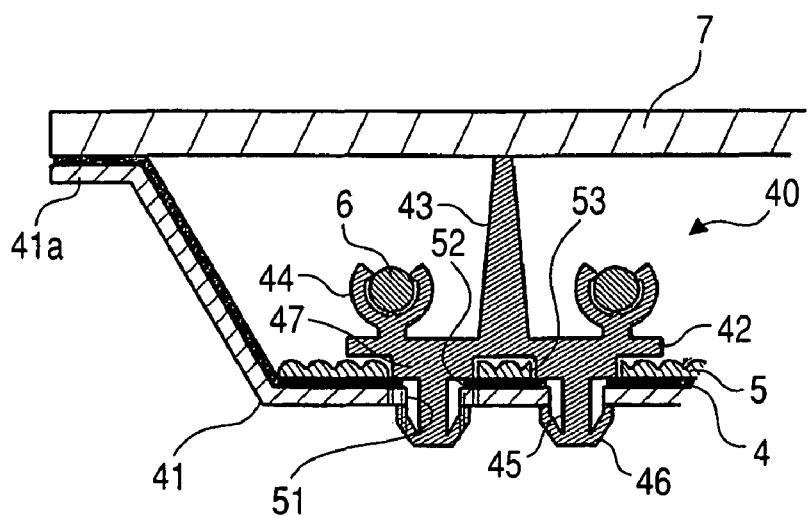
FIG. 30 is a sectional side view showing a fixing state of the fixing member in the second structure example.

FIG. 28 is an exploded perspective view showing a second structure example of the image display device according to the third embodiment of the invention. FIG. 29 is a perspective view showing a structure of the fixing member 40 in the second structure example and FIG. 30 is a sectional side view showing a fixing state of the fixing member 40 in the second structure example.

In the second structure example, the piercing holes 52 in the reflective member 4 are set to be larger in size than the piercing holes 51 in the casing 41 as well as the piercing holes 53 in the light control member 5 are set to be larger in size than the piercing holes 52 in the reflective member 4. At the fixing member 40, stepped portions 47 are provided on the side at which the pin portions 45 protrude. The stepped portions 47 are formed in a state of protruding partially at two points from the lower surface of the base portion 42, which have a circular shape which is concentric with the lid portions 42a and the pin portions 45. An outer diameter of the stepped portions 47 is set to be smaller in size than the piercing holes 53 in the light control member 5 as well as larger in size than the piercing holes 52 in the reflective member 4. The difference of sizes of the outer diameter of the stepped portions 47 and the hole diameter of the piercing holes 53 of the light control member 5 is preferably set to be, for example, 0.2 mm or more.

The step difference of the stepped portions 47 on the basis of the lower surface of the base portion 42 is set to be larger in size than the thickness size of the light control member 5 (for example, the size larger than 50 μm or more). The thickness size of the light control member 5 is prescribed as the thickness size from the reference surface 5a to an apex of a convex portion in the rugged structure portion 8 when the rugged structure portion 8 is formed at one surface of the light control member 5. When the rugged structure portion 8 is formed on both surfaces of the light control member 5, the thickness size is prescribed as the thickness size from an apex of a convex portion in one rugged structure portion 8 to an apex of a convex portion of the other rugged structure portion 8.

The sizes of respective members are set so that the total thickness size in which the reflective member 4 and the casing 41 are added up is set is slightly larger than a space size Lb between the stepped portions 47 and the expand/contract portions 46. Accordingly, when the expand/contract portions 46 at the tips of the pin portions 45 of the fixing member 40 are inserted into the piercing holes 51, 52 and 53 from the light control member 5 side in the state in which the reflective member 4 and the light control member 5 are overlapped on the casing 41 as described above, the expand/contract portions 46 becomes in the state of being locked at the outer surface of the casing 41. Additionally, the base portion 42 bites the reflective member 4 by the pressing force added to the base portion 42.

In the state in which the fixing members 40 are fixed as the above state, a slight gap is imposed between the base portion 42 and the light control member 5, however, the gap is allowed to be sufficiently small to thereby prevent falling, dropout, drooping and like of the light control member 5, for example, even when the surface light source device 3 is turned upside down. Since the expand/contract portions 46 is locked at the outer surface of the casing 41 in the state in which the base portion 42 of the fixing member 40 bites the reflective member 4, it is possible to prevent the fixing member 40 from resonating due to the effect of vibration of a speaker and the like or generating abnormal noise. The piercing holes 51, 52 provided at the casing 41 and the reflective member 4 are completely filled by the stepped portions 47. Accordingly, it is possible to prevent foreign substances or outside air from getting into the surface light source device 3 through the piercing holes 51, 52. In a surface direction of the reflection member 4, the position of the light control member 5 is not prescribed by the fixing member 40. Therefore, the light control member 5 is not corrugated even if the light control member 5 expands or contracts due to, for example, the effect of heat and the like received from the light sources 6. Therefore, it is possible to prevent light from proceeding in an unexpected direction due to corrugation phenomenon of the light control member 5 and to prevent reduction of uniformity of luminance and display quality due to the above before happens.

Additionally, as an application example, concerning the hole diameter of the piercing hole 53 in the light control member 5, it is preferable that a first piercing hole which is larger than the outer diameter of the stepped portion 47 and a second piercing hole which is smaller than the first piercing hole are provided, and the second piercing hole may be a positioning hole for fixing. In the case that only one second-piercing hole to be the positioning hole is provided, it is desirable that a circular second piercing hole is provided at one corner of the light control member 5 of the sheet state having a rectangular shape in plan view, and an elliptic piercing hole along a diagonal axis is provided at a corner which is opposite to the one corner to absorb elongation of the sheet in the diagonal direction. Moreover, when piercing holes are provided at other two diagonal corner portions, it is desirable that respective piercing holes are made to elliptic piercing holes along the diagonal axis to absorb elongations of the sheet in the longitudinal direction as well as in the lateral direction.

In the above third embodiment, the method of inserting the pin portions 45 of the fixing member 40 into the piercing holes 51 of the casing 41 is applied, however, it is not limited to this, and it is also preferable to apply a structure in which, for example, the fixing member is slid in the lateral direction in a state in which the pin portions of the fixing member are inserted into piercing holes in the casing and the like to thereby lock locking portions at tips of the pin portions on the outer surface of the casing thereby fixing the members to one another, though not shown. As the structure of the fixing member 40, a structure not having the column portion 43 and the light-source fixing portions 44 can be applied. It is also apply a structure in which the fixing member 40 having the column portion 43 and the light-source fixing portions 44 and the fixing member 40 not having these portions are fixed in the surface of the light control member 5 in the mixed state.

In the above third embodiment, the piercing holes 51, 52 and 53 are provided in pairs, and the pin portions 45 and the expand/contract portions 46 are provided in the fixing portion 40 in pairs, however, it is not limited to this. For example, it is also preferable to apply a structure in which the piercing holes 51, 52 and 53 are provided singly, and the pin portion 45 and the expand/contract portion 46 in the fixing member 40 to be fitted thereto are provided singly. Particularly, when the fixing member 40 has a rotation symmetry shape in a structure not having the light-source fixing portion 44, it is preferable that the pin portion 45 and the expand/contract portion 46 are provided singly. It is also preferable that the reflection member 4 is fixed to the casing 41 by using, for example, an adhesive such as a double-stick tape.

In the above respective embodiments, a linear light source using the cold cathode lamp is cited as the light source 6, the light source of the surface light source device 3 is not limited to this. For example, the light source of the surface light source device 3 may be the one in which plural LEDs are aligned in a linear manner. Additionally, as an example which is different from the linear light source, for example, point sources such as LEDs are two-dimensionally aligned in a matrix state may be applied. In this case, it is desirable to form the rugged structure portion 8 concentrically about the point sources.

In the above respective embodiments, the diffusing member 7 in which a light scattering material not having orientation is mixed is used, however, it is not limited to this, and it is also preferable to use a shaped diffusing plate, for example, disclosed in the above Patent Document 1. The shaped diffusing plate itself intends to reduce the whole thickness or to decrease the number of light sources due to improvement of light diffusing ability, which is the same as embodiments of the invention, however, these techniques do not contradict each other, therefore, they can be used at the same time. When they are used at the same time, it is possible to realize further improvement of light diffusing ability.

It should be understood by those skilled in the art that various modifications, combinations, sub-combinations and alterations may occur depending on design requirements and other factors insofar as they are within the scope of the appended claims or the equivalents thereof.

What is claimed is:

1. A surface light source device comprising:
   a diffusing member which diffuses light;
   a reflective member which reflects light;
   plural light sources provided aligned in a flat manner between the diffusing member and the reflective member; and
   a light control member provided between the plural light sources and the reflective member as well as arranged in a state that a gap is imposed between the reflective member and the light control member, which has a light-guiding function of guiding part of light emitted from respective light sources in an alignment direction of the light sources, and
   wherein the light control member has a rugged structure portion in which geometric shapes in cross section are continuously formed on at least one surface,
   wherein the light control member has the rugged structure portion at a surface of a side facing the reflective member, and
   wherein the light control member is arranged in the state that apexes of convex portions included in the rugged structure portion are allowed to abut on a reflective surface of the reflective member.

2. The surface light source device according to claim 1, wherein the light control member has the rugged structure portion at a surface of a side facing the plural light sources.

3. A surface light source device comprising:
   a diffusing member which diffuses light;
   a reflective member which reflects light;
   plural light sources provided aligned in a flat manner between the diffusing member and the reflective member; and
   a light control member provided between the plural light sources and the reflective member as well as arranged in a state that a gap is imposed between the reflective member and the light control member, which has a light-guiding function of guiding part of light emitted from respective light sources in an alignment direction of the light sources, wherein the light control member has a rugged structure portion in which geometric shapes in cross section are continuously formed on at least one surface, and wherein a convex portion included in the rugged structure portion is formed to have a polygonal shape in cross section including at least two slopes having different inclination angles with respect to a reference axis which is perpendicular to a virtual plane parallel to a light emitting surface of the diffusing member.

4. The surface light source device according to claim 3, wherein the polygonal shape in cross section is a triangular shape in cross section and a bisector of an angle formed by the two slopes inclines with respect to the reference axis in at least part of convex portions.

5. The surface light source device according to claim 4, wherein, when a inclination angle of the bisector with respect to the reference axis is "θ", convex portions having a triangular shape in cross section which forms the inclination angle θ are formed in a repeated manner.

6. The surface light source device according to claim 5, wherein the convex portions having a triangular shape in cross section which forms the inclination angle θ are formed continuously, every other portion or every plural portions in a repeated manner.

7. The surface light source device according to claim 4, wherein, in adjacent two convex portions in the alignment direction of the light sources, the bisector of one convex portion inclines in a first direction at the angle θ from the reference axis, and the bisector of the other convex portion inclines in a second direction which is opposite to the first direction at the same angle as the angle θ from the reference axis.

8. The surface light source device according to claim 3, wherein a convex portion in the rugged structure portion is formed to be a figure which is a line symmetry with an axis parallel to the reference axis as the center as well as a polygonal shape in cross section including slopes of four or more.

9. A surface light source device comprising:
a diffusing member which diffuses light;
a reflective member which reflects light;
plural light sources provided aligned in a flat manner between the diffusing member and the reflective member;
a light control member provided between the plural light sources and the reflective member as well as arranged in a state that a gap is imposed between the reflective member and the light control member, which has a light-guiding function of guiding part of light emitted from respective light sources in an alignment direction of the light sources,
a casing covered with the reflective member; and
a fixing member including pin portions in which locking portions are provided at tips, which fixes the reflective member and the light control member to the casing, wherein the light control member has a rugged structure portion in which geometric shapes in cross section are continuously formed on at least one surface, and wherein piercing holes are provided at plural positions corresponding to portions in the reflective member, the light control member and the casing, and the locking portions are locked at an outer surface of the casing in a state in which the pin portions of the fixing member are inserted into respective piercing holes from the light control member side.

10. The surface light source device according to claim 9, wherein the fixing member includes stepped portions having steps larger than a thickness size of the light control member, and wherein piercing holes in the reflective member and the casing are smaller than an outer diameter of the stepped portions and the piercing holes in the light control member are larger than the outer diameter of the stepped portions.

11. The surface light source device according to claim 10, wherein the light control member includes a first piercing hole which is larger than the outer diameter of the stepped portions and a second piercing hole which is smaller than the first piercing hole, and the second piercing hole is made to be a positioning hole for fixing.

12. An image display device comprising:
a surface light source device including a diffusing member which diffuses light, a reflective member which reflects light, plural light sources provided aligned in a flat manner between the diffusing member and the reflective member, and a light control member provided between the plural light sources and the reflective member as well as arranged in a state that a gap is imposed between the reflective member and the light control member, which has a light-guiding function of guiding part of light emitted from respective light sources in an alignment direction of the light sources, in which the light control member has a rugged structure portion in which geometric shapes in cross section are continuously formed on at least one surface; and
a display panel in which light irradiated from the surface light source device is selectively transmitted, wherein the light control member has the rugged structure portion at a surface of a side facing the reflective member, and wherein the light control member is arranged in the state that apexes of convex portions included in the rugged structure portion are allowed to abut on a reflective surface of the reflective member.

* * * * *